(12) United States Patent
Narikawa

(10) Patent No.: US 8,736,774 B1
(45) Date of Patent: May 27, 2014

(54) PROJECTION APPARATUS, PROJECTION METHOD AND COMPUTER-READABLE STORAGE MEDIUM FOR CORRECTING A PROJECTION STATE BEING PROJECTED ONTO CURVED SURFACE

(71) Applicant: Casio Computer Co., Ltd., Tokyo (JP)

(72) Inventor: Tetsuro Narikawa, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 14/083,282

(22) Filed: Nov. 18, 2013

(30) Foreign Application Priority Data

Nov. 19, 2012 (JP) .................................. 2012-253624

(51) Int. Cl.
*H04N 5/64* (2006.01)
*H04N 9/31* (2006.01)

(52) U.S. Cl.
USPC ............ 348/744; 348/745; 348/580; 348/571; 348/364; 348/241; 348/218.1; 348/147; 348/136; 348/37; 353/30; 353/31; 353/69; 353/84; 353/85; 353/94; 353/121; 359/32; 359/451; 345/421; 345/647; 382/254; 382/276; 382/285

(58) Field of Classification Search
USPC ............ 348/744, 745, 241, 37, 136, 147, 580, 348/571, 364, 218.1; 353/69, 30, 31, 84, 353/85, 94, 121; 359/32, 451; 345/421, 345/647; 382/285, 254, 276
See application file for complete search history.

(56) References Cited

U.S. PATENT DOCUMENTS

| | | | | |
|---|---|---|---|---|
| 4,104,425 | A * | 8/1978 | Hirmann | 428/12 |
| 4,464,841 | A * | 8/1984 | McCay et al. | 33/520 |
| 4,513,674 | A * | 4/1985 | Bhatia et al. | 112/220 |
| 5,000,680 | A * | 3/1991 | Jenness | 432/103 |
| 6,388,911 | B1 * | 5/2002 | Lee | 365/104 |
| 6,695,451 | B1 * | 2/2004 | Yamasaki et al. | 353/30 |
| 7,104,653 | B2 | 9/2006 | Moriwaki et al. | |
| 8,155,477 | B2 * | 4/2012 | Utsugi | 382/275 |
| 2003/0067587 | A1 * | 4/2003 | Yamasaki et al. | 353/30 |
| 2003/0095701 | A1 * | 5/2003 | Shum et al. | 382/155 |
| 2008/0057418 | A1 * | 3/2008 | Seltmann et al. | 430/30 |
| 2009/0074323 | A1 * | 3/2009 | Utsugi | 382/275 |
| 2011/0193997 | A1 * | 8/2011 | Hatakeyama | 348/241 |
| 2012/0314115 | A1 * | 12/2012 | Suga | 348/333.1 |

FOREIGN PATENT DOCUMENTS

JP 2004-320662 A 11/2004

* cited by examiner

*Primary Examiner* — Jefferey Harold
*Assistant Examiner* — Mustafizur Rahman
(74) *Attorney, Agent, or Firm* — Holtz Holtz Goodman & Chick PC

(57) ABSTRACT

A chart generation unit generates an adjustment chart, and a projection unit projects the adjustment chart onto a circular cylinder. A parameter acquiring unit acquires 12 parameters in total, relating to the positions of four corners and middle points of a top side and a bottom side of a chart and lateral expansion of the chart, the chart being input by a user through manipulations of an operation unit. A transform function determination unit calculates, from the total of 12 parameters, an accurate transform function for projecting an image onto the circular cylinder. An image conversion unit applies geometric transformation to the image based on the calculated transform function.

13 Claims, 17 Drawing Sheets

PROJECTION APPARATUS, PROJECTION METHOD AND COMPUTER-READABLE STORAGE MEDIUM FOR CORRECTING A PROJECTION STATE BEING PROJECTED ONTO CURVED SURFACE

BACKGROUND

1. Technical Field

The present invention relates to a projection apparatus, a projection state adjustment method, and a projection state adjustment program.

2. Related Art

Generally, a projector as an image projection apparatus is known, in which an image based on image data output from a personal computer, for example, is projected onto a projection target such as a screen.

Such a projector is sometimes used to project an image onto the curved surface of a circular cylinder, for example.

For example, in the case where an image with no distortion is appropriately projected onto a circular cylinder, it is necessary to apply geometric correction to a projected image.

Functions for use in such geometric correction are different depending on the positional relationship between the projector and the circular cylinder, such as the orientation of the projector relative to the circular cylinder, a distance from the projector to the circular cylinder, and the diameter of the circular cylinder.

Thus, it is necessary to provide the settings of geometric correction depending on the positional relationship between the projector and the circular cylinder, for example.

Some methods are known as a setting method for such geometric correction.

For example, a first method is a method in which a projector is used to project a grid pattern onto a circular cylinder, and a user adjusts the positions of intersection points of grids to sequentially change the set values of geometric correction.

A second method is a method in which a distance and a direction from a projector to a circular cylinder, the range of a screen on the circular cylinder, the angle of view of the projector, the position of an optical axis, and so on are found, and correction values necessary for geometric correction are calculated from the values.

For a third method, a technique is disclosed in JP-A-2004-320662, for example, in which typical geometric correction methods not directly involved in a circular cylinder are combined to adjust images.

As for the foregoing setting methods for geometric correction, according to the first method, for example, the user can intuitively perform manipulations.

However, it is necessary to adjust a large number of positions of intersection points, and it takes a lot of time and effort.

For example, in the second method, it is necessary to accurately determine the positional relationship between the projector and the circular cylinder, for example, which is usually difficult to determine, and it is difficult to implement the second method.

For example, according to the third method, the user can relatively easily perform manipulations because the amount of manipulations is small.

However, it is difficult for the user to intuitively grasp which geometric correction methods to combine.

Moreover, the first method and the third method provide approximate settings, and the methods do not always provide mathematically accurate correction.

SUMMARY

Therefore, it is an object of the present invention to provide a projection apparatus, a projection state adjustment method, and a projection state adjustment program that can accurately adjust the projection of an image onto a circular cylinder surface with easy manipulations by intuition.

In order to achieve the above object, a projection apparatus according to an aspect of the present invention includes:

a projection unit configured to project an image onto a target area on a curved surface formed of generatrices of a circular cylinder;

an image conversion unit configured to apply geometric transformation to a projected image projected by the projection unit;

a parameter acquiring unit configured to acquire a parameter expressing a positional relationship between the projection unit and the curved surface; and a transform function determination unit configured to determine a transform function for use in the geometric transformation based on the parameter, wherein the target area is an area surrounded by:

a first line and a second line which are parallel to an axis of the circular cylinder;

a third line that is an intersection line of a first plane perpendicular to the axis with the curved surface; and a fourth line that is an intersection line of a second plane parallel to the first plane with the curved surface, and when an image area is such an area that the image applied the geometric transformation is projected onto the curved surface, the parameter includes:

a four-corner parameter to match four corners of the image area and four corners of the target area;

a first middle point parameter to match a first middle point that is a middle point of a top side of the image area and a middle point of the third line of the target area;

a second middle point parameter to match a second middle point that is a middle point of a bottom side of the image area and a middle point of the fourth line of the target area; and a second reference line parameter to, when a line connecting the first middle point to the second middle point of the image area is a first reference line, adjust a position of a second reference line provided between a left side of the image area and the first reference line, or between a right side of the image area and the first reference line.

In order to achieve the above object, a projection apparatus according to an aspect of the present invention includes:

a projection unit configured to project an image onto a target area on a curved surface formed of generatrices of a circular cylinder;

an image conversion unit configured to apply geometric transformation to a projected image projected by the projection unit;

a parameter acquiring unit configured to acquire a parameter expressing a positional relationship between the projection unit and the curved surface; and a transform function determination unit configured to determine a transform function for use in the geometric transformation based on the parameter, wherein the target area is an area surrounded by:

a first line and a second line which are parallel to an axis of the circular cylinder;

a third line that is an intersection line of a first plane perpendicular to the axis with the curved surface; and a fourth line that is an intersection line of a second plane parallel to the first plane with the curved surface, and the geometric transformation includes:

rotation projection transformation between a plane and a plane; and circular cylinder geometric transformation between the target area and a plane parallel to a third plane passing between the first line and the second line.

In order to achieve the above object, a projection state adjustment method according to an aspect of the present invention includes the steps of:

projecting an image onto a target area on a curved surface formed of generatrices of a circular cylinder from a projection unit;

applying geometric transformation to a projected image projected from the projection unit;

acquiring a parameter expressing a positional relationship between the projection unit and the curved surface; and determining a transform function for use in the geometric transformation based on the parameter, wherein the target area is an area surrounded by:
a first line and a second line which are parallel to an axis of the circular cylinder;
a third line that is an intersection line of a first plane perpendicular to the axis with the curved surface; and
a fourth line that is an intersection line of a second plane parallel to the first plane with the curved surface, and when an image area is such an area that the image applied the geometric transformation is projected onto the curved surface, the parameter includes:
a four-corner parameter to match four corners of the image area and four corners of the target area;
a first middle point parameter to match a first middle point that is a middle point of a top side of the image area and a middle point of the third line of the target area;
a second middle point parameter to match a second middle point that is a middle point of a bottom side of the image area and a middle point of the fourth line of the target area; and
a second reference line parameter to, when a line connecting the first middle point to the second middle point of the image area is a first reference line, adjust a position of a second reference line provided between a left side of the image area and the first reference line, or between a right side of the image area and the first reference line.

In order to achieve the above object, a projection state adjustment method according to an aspect of the present invention includes the steps of:

projecting an image onto a target area on a curved surface formed of generatrices of a circular cylinder from a projection unit;

applying geometric transformation to a projected image projected from the projection unit;

acquiring a parameter expressing a positional relationship between the projection unit and the curved surface; and determining a transform function for use in the geometric transformation based on the parameter, wherein the target area is an area surrounded by:
a first line and a second line which are parallel to an axis of the circular cylinder;
a third line that is an intersection line of a first plane perpendicular to the axis with the curved surface; and
a fourth line that is an intersection line of a second plane parallel to the first plane with the curved surface, and the geometric transformation includes:
rotation projection transformation between a plane and a plane; and
circular cylinder geometric transformation between the target area and a plane parallel to a third plane passing between the first line and the second line.

In order to achieve the above object, a non-transitory computer-readable storage medium according to an aspect of the present invention stores a projection state adjustment program that causes a computer to:

project an image onto a target area on a curved surface formed of generatrices of a circular cylinder from a projection unit;

apply geometric transformation to a projected image projected from the projection unit;

acquire a parameter expressing a positional relationship between the projection unit and the curved surface; and determine a transform function for use in the geometric transformation based on the parameter, wherein the target area is an area surrounded by:
a first line and a second line which are parallel to an axis of the circular cylinder;
a third line that is an intersection line of a first plane perpendicular to the axis with the curved surface; and
a fourth line that is an intersection line of a second plane parallel to the first plane with the curved surface, and when an image area such an area that the image applied the geometric transformation is projected onto the curved surface, the parameter includes:
a four-corner parameter to match four corners of the image area and four corners of the target area;
a first middle point parameter to match a first middle point that is a middle point of a top side of the image area and a middle point of the third line of the target area;
a second middle point parameter to match a second middle point that is a middle point of a bottom side of the image area and a middle point of the fourth line of the target area; and
a second reference line parameter to, when a line connecting the first middle point to the second middle point of the image area is a first reference line, adjust a position of a second reference line provided between a left side of the image area and the first reference line, or between a right side of the image area and the first reference line.

In order to achieve the above object, a non-transitory computer-readable storage medium according to an aspect of the present invention stores a projection state adjustment program that causes a computer to:

project an image onto a target area on a curved surface formed of generatrices of a circular cylinder from a projection unit;

apply geometric transformation to a projected image projected from the projection unit;

acquire a parameter expressing a positional relationship between the projection unit and the curved surface; and determine a transform function for use in the geometric transformation based on the parameter, wherein the target area is an area surrounded by:
a first line and a second line which are parallel to an axis of the circular cylinder;
a third line that is an intersection line of a first plane perpendicular to the axis with the curved surface; and
a fourth line that is an intersection line of a second plane parallel to the first plane with the curved surface, and the geometric transformation includes:
rotation projection transformation between a plane and a plane; and
circular cylinder geometric transformation between the target area and a plane parallel to a third plane passing between the first line and the second line.

DETAILED DESCRIPTION

An embodiment of the present invention will be described with reference to the drawings. A projection apparatus according to the embodiment uses a digital light processing (DLP) (registered trademark) method using a micromirror display device.

Figure 1:
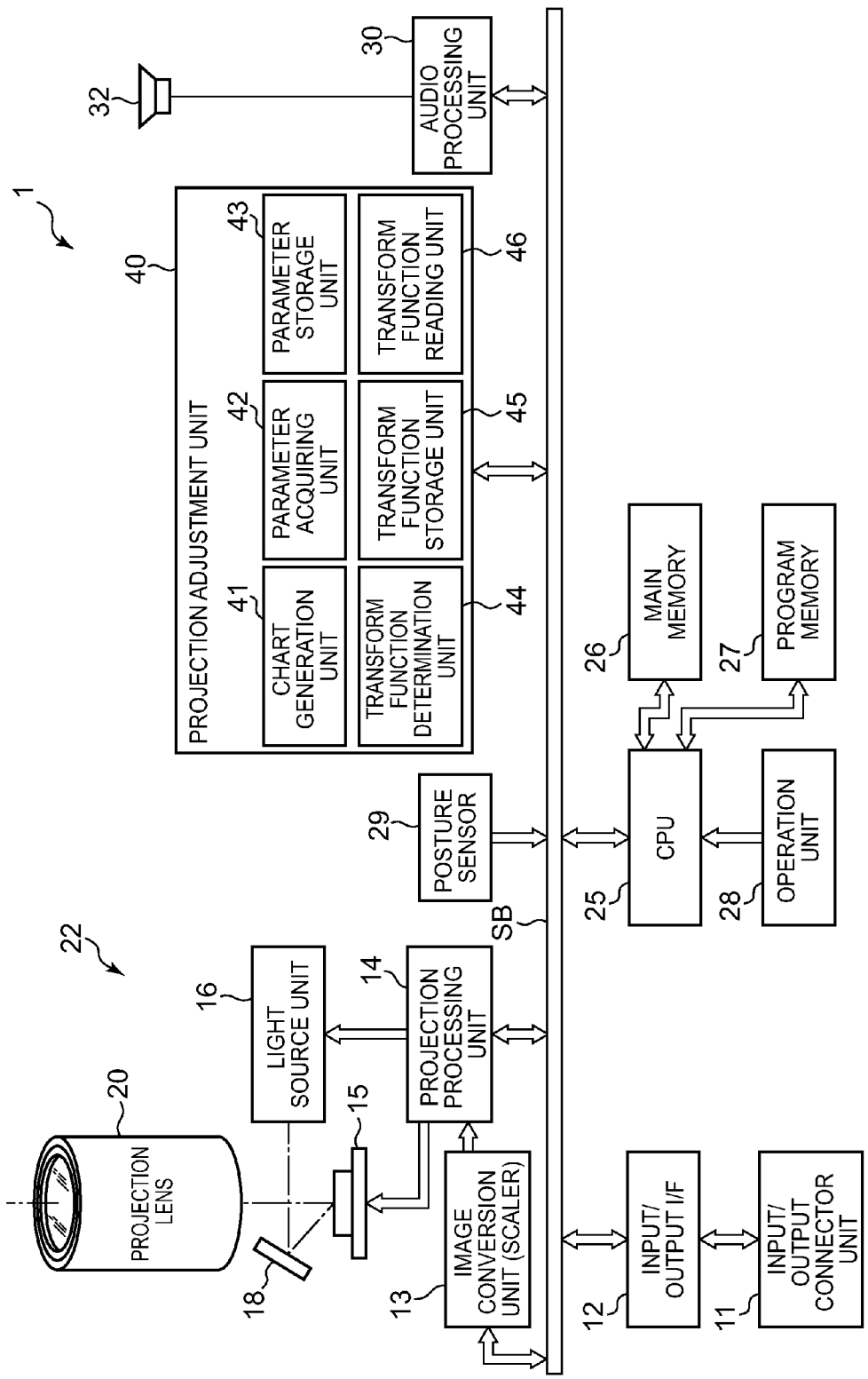
FIG. 1 is a block diagram of an exemplary configuration of a projector according to an embodiment of the present invention.

FIG. 1 is a diagram of the schematic configuration of a projector 1 as the projection apparatus according to the embodiment.

The projector 1 according to the embodiment can appropriately project an image with no distortion onto a circular cylinder.

Thus, the projector 1 performs geometric transformation on a projected image.

The projector 1 is configured to acquire parameters necessary for geometric transformation from a user, as described later.

The projector 1 includes an input/output connector unit 11, an input/output interface (I/F) 12, an image conversion unit 13, a projection processing unit 14, a micromirror element 15, a light source unit 16, a mirror 18, a projection lens 20, a CPU 25, a main memory 26, a program memory 27, an operation unit 28, a posture sensor 29, an audio processing unit 30, a speaker 32, a projection adjustment unit 40, and a system bus SB.

The input/output connector unit 11 is provided with a terminal such as a pin jack (RCA) type video input terminal or a D-sub 15 type RGB input terminal, for example, to which analog image signals are input.

The input image signals are input to the image conversion unit 13 through the input/output I/F 12 and the system bus SB.

The input analog image signals in various standards are converted into digital image signals at the input/output I/F 12.

It is noted that the input/output connector unit 11 may be configured to include an HDMI (registered trademark) terminal, for example, and to receive digital image signals as well as analog image signals.

Moreover, the input/output connector unit 11 receives analog or digital audio signals.

The input audio signals are input to the audio processing unit 30 through the input/output I/F 12 and the system bus SB.

Furthermore, the input/output connector unit 11 may be provided with an RS232C terminal or a USB terminal, for example.

The image conversion unit 13 is also called a scaler.

The image conversion unit 13 converts the input image data to adjust resolution, a grayscale level, and the like and generates image data in a predetermined format appropriate for projection.

The image conversion unit 13 transmits the converted image data to the projection processing unit 14.

The image conversion unit 13 transmits, to the projection processing unit 14, image data on which symbols representing various operating states for an on-screen display (OSD) have been superimposed, as processed image data, when necessary.

Moreover, the image conversion unit 13 performs geometric transformation on a projected image to project, onto a projection target such as a screen, an image in an appropriate shape in accordance with a projection state.

Specifically, in the embodiment, the image conversion unit 13 performs geometric transformation to appropriately project an image onto a circular cylinder.

The light source unit 16 emits light of a plurality of colors including the primary colors of red (R), green (G), and blue (B).

The light source unit 16 is configured to sequentially emit the plurality of colors divided in time.

The light emitted from the light source unit 16 is totally reflected by the mirror 18 and enters the micromirror element 15.

The micromirror element 15 includes a plurality of micromirrors arranged in an array.

The micromirrors operate on/off at high speeds, and reflect the light emitted from the light source unit 16 in a direction of the projection lens 20, or divert the light in a direction away from the projection lens 20.

A necessary number of the micromirrors for, for example, WXGA (Wide eXtended Graphic Array) (1280 pixels wide× 800 pixels high) is arranged in the micromirror element 15.

With the reflection from the micromirrors, the micromirror element 15 forms an image in, for example, the WXGA resolution.

In this manner, the micromirror element 15 functions as a spatial optical modulator.

The projection processing unit 14 drives the micromirror element 15 to display an image represented by the image data transmitted from the image conversion unit 13 in accordance with the image data.

In other words, the projection processing unit 14 operates on/off of the micromirrors of the micromirror element 15.

The projection processing unit 14 drives the micromirror element 15 in time division at high speeds.

The number of divisions of a unit time is obtained by multiplying a frame rate in accordance with a predetermined format [frames/second], the number of divided color components, and the number of display grayscale levels.

Moreover, the projection processing unit 14 also controls the operation of the light source unit 16 in synchronization with the operation of the micromirror element 15.

In other words, the projection processing unit 14 divides each frame in time, and controls the operation of the light source unit 16 to sequentially emit the light of all the color components in each frame.

The projection lens 20 adjusts the light guided from the micromirror element 15 to light to be projected onto a projection target (not illustrated) such as a screen or a circular cylinder.

Therefore, an optical image formed by the reflected light from the micromirror element 15 is projected and displayed on the projection target such as a screen or a circular cylinder via the projection lens 20.

The projection lens 20 includes a zoom mechanism and has a function of changing the size of an image to be projected.

Moreover, the projection lens 20 includes a focus adjustment mechanism for adjusting the focus state of a projected image.

In this manner, the projection processing unit 14, the micromirror element 15, the light source unit 16, the projection lens 20, and the like function as a projection unit 22 that projects an image.

The audio processing unit 30 includes a sound generator such as a PCM sound source.

The audio processing unit 30 drives the speaker 32 to amplify and release sounds based on analog audio data input from the input/output connector unit 11 or based on an analog signal obtained by converting digital audio data given upon projection operation.

Moreover, the audio processing unit 30 generates a beep sound and the like when necessary.

The speaker 32 is a general speaker that emits the sound based on the signal input from the audio processing unit 30.

The CPU 25 controls the operation of the image conversion unit 13, the projection processing unit 14, the audio processing unit 30, and the projection adjustment unit 40 described below.

The CPU 25 is connected to the main memory 26 and the program memory 27.

The main memory 26 includes, for example, an SRAM.

The main memory 26 functions as working memory of the CPU 25.

The program memory 27 includes an electrically rewritable nonvolatile memory.

The program memory 27 stores an operating program, various fixed-format data, and the like that are executed by the CPU 25.

Moreover, the CPU 25 is connected to the operation unit 28.

The operation unit 28 includes a key operation unit provided to a main body of the projector 1, and an infrared light receiving unit that receives infrared light from a remote control (not illustrated) dedicated to the projector 1.

The operation unit 28 includes an arrow key and an OK button.

The operation unit 28 outputs, to the CPU 25, a key operation signal based on a key operated by a user with the key operation unit of the main body or the remote control.

The CPU 25 uses the program and data stored in the main memory 26 and the program memory 27 to control the operation of the units of the projector 1 in accordance with the user's instruction from the operation unit 28.

The posture sensor 29 includes a three-axis accelerometer, for example.

The accelerometer detects the angle of posture of the projector 1 in the gravity direction, that is, the angles of pitch and roll.

The posture sensor 29 outputs the detected result to the projection adjustment unit 40.

However, the posture sensor 29 is not a necessary component, as described later.

The projection adjustment unit 40 determines a transform function for image geometric transformation used for appropriately projecting an image onto a circular cylinder, for example.

The projection adjustment unit 40 includes a chart generation unit 41, a parameter acquiring unit 42, a parameter storage unit 43, a transform function determination unit 44, a transform function storage unit 45, and a transform function reading unit 46.

The chart generation unit 41 generates a projection state adjustment chart, described later.

The adjustment chart is generated by reading a grid pattern and markers or the like to display parameters to be presently adjusted, for example, which are recorded on the program memory 27.

The parameter acquiring unit 42 acquires 12 conversion parameters, described later, based on the input from the user, for example.

The parameter storage unit 43 stores the conversion parameters acquired by the parameter acquiring unit 42.

The transform function determination unit 44 calculates a transform function for use in geometric transformation of an image based on the conversion parameters acquired by the parameter acquiring unit 42.

The transform function storage unit 45 stores the transform function calculated by the transform function determination unit 44.

The transform function reading unit 46 reads the transform function stored on the transform function storage unit 45, and outputs the transform function to the image conversion unit 13, for example.

The image conversion unit 13 performs the geometric transformation of an image based on the transform function.

The operation of the projector 1 according to the embodiment will be described.

Let us consider the case where the projector 1 projects an image onto a curved surface formed of generatrices of a right circular cylinder.

First, the relationship among the projector 1, a circular cylinder 200, a projection area 100, and a target area 210 onto which an image is projected, will be described with reference to FIG. 2.

Suppose that a range in which light emitted from the projection lens 20 of the projector 1 is projected onto a projection target is referred to as the projection area 100.

On the surface of the circular cylinder 200, the area onto which an image is desired to be projected is referred to as the target area 210.

In the embodiment, the projector 1 operates to project an image onto the circular cylinder 200 as if a sheet with a rectangular image depicted thereon is attached to the circular cylinder 200.

The target area 210 is the area corresponding to the sheet, onto which an image is finally projected.

Here, a left side 212 and a right side 214 of the target area 210 are set parallel to a center axis 202 of the circular cylinder 200.

A top side 216 and a bottom side 218 of the target area 210 are disposed on a plane perpendicular to the center axis 202 of the circular cylinder 200.

On the projection area 100, suppose that an area including an image corrected by geometric transformation is referred to as an image area 101.

That is, the projector 1 according to the embodiment operates to match the image area 101 and the target area 210.

Here, the projector 1 performs geometric transformation to project a desired image onto the circular cylinder 200 as if a sheet with this image depicted thereon is attached to the circular cylinder 200.

With this geometric transformation, a desired image is included in the image area 101, and the image area 101 matched with the target area 210.

First, the degree of freedom of the projection state will be described with reference to FIGS. 3 to 5.

Figure 3:
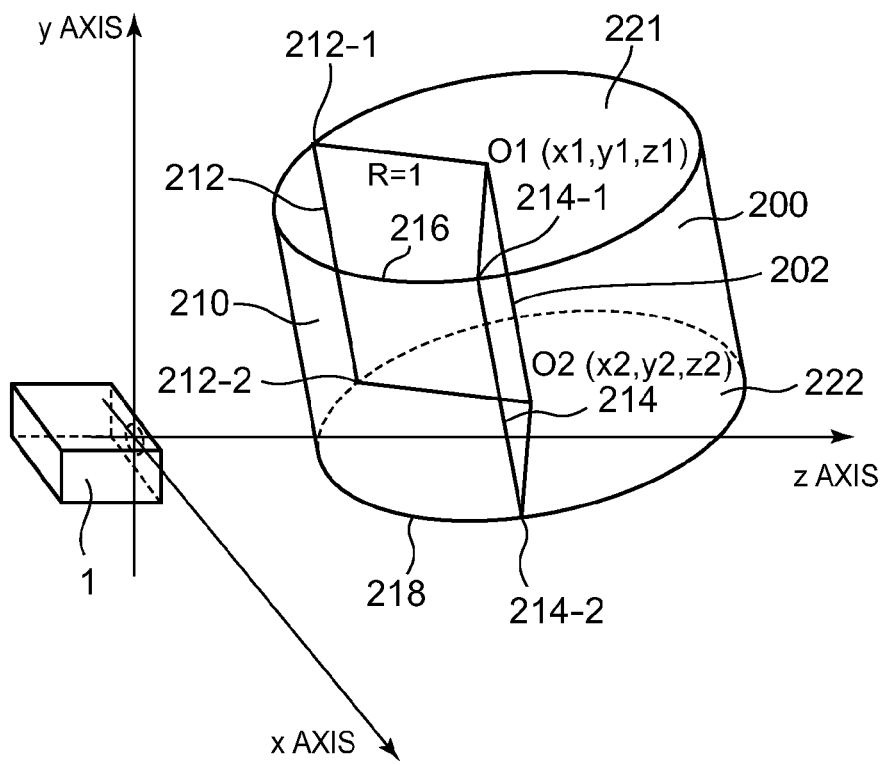
FIG. 3 is a diagram illustrating the degree of freedom of the positional relationship between the projector and the circular cylinder.

As depicted in FIG. 3, a coordinate system is defined as follows, with the position of the projection lens 20 of the projector 1 being the origin point.

That is, the projection direction of the projector 1 is defined as a z-axis.

The right direction of the projector 1 is defined as an x-axis, and the upper direction is defined as a y-axis on a plane perpendicular to the z-axis when the projector 1 is oriented in the z-axis direction.

FIG. 3 is a diagram of the positional relationship among the projector 1, the circular cylinder 200, and the target area 210.

As described above, the left side 212 and the right side 214 of the target area 210 are parallel to each other, and the left side 212 and the right side 214 are also parallel to the center axis 202 of the circular cylinder 200.

Moreover, suppose that a plane passing through a top end 212-1 of the left side 212 and perpendicular to the center axis 202 of the circular cylinder 200 is a first plane 221. The first plane 221 passes through a top end 214-1 of the right side 214.

Furthermore, in the intersection line of the circular cylinder 200 with the first plane 221, a portion sandwiched between the left side 212 and the right side 214 is matched with the top side 216 of the target area 210.

Suppose that a plane passing through a lower end 212-2 of the left side 212 and perpendicular to the center axis 202 of the circular cylinder 200 is a second plane 222. The second plane 222 passes through a lower end 214-2 of the right side 214.

In addition, in the intersection line of the circular cylinder 200 with the second plane 222, a portion sandwiched between the left side 212 and the right side 214 is matched with the bottom side 218 of the target area 210.

Suppose that the intersection point of the center axis 202 of the circular cylinder 200 with the first plane 221 is a first center O1, and the intersection point of the center axis 202 of the circular cylinder 200 with the second plane 222 is a second center O2.

The degree of freedom of the circular cylinder 200 relative to the projector 1 can be expressed by six degrees of freedom in total, i.e., coordinates O1 (x1, y1, z1) of the first center O1 and coordinates O2 (x2, y2, z2) of the second center O2.

It is noted that since the change in a radius R of the circular cylinder is the same as expansion or contraction of the entire coordinate system including the projector 1 and the circular cylinder 200, the radius R of the circular cylinder is set to one, and is not included in the degree of freedom.

Figure 4:
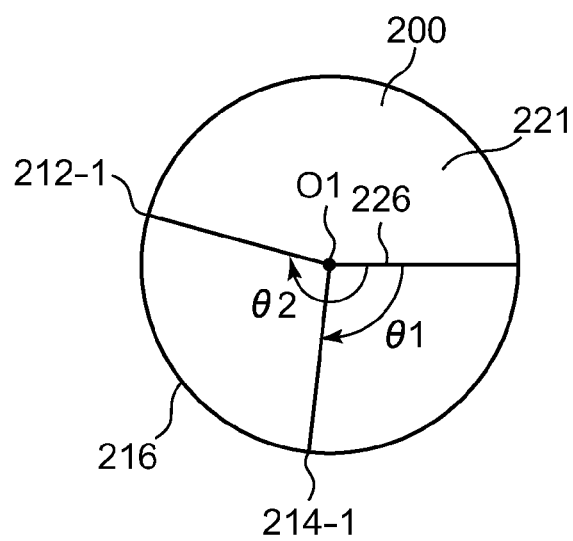
FIG. 4 is a diagram illustrating the degree of freedom of the positional relationship between the projector and the circular cylinder.

FIG. 4 is a diagram of the first plane 221.

As depicted in FIG. 4, a rotation angle to the top end 214-1 of the right side 214 from a given reference line 226 is set to θ1, and a rotation angle to the top end 212-1 of the left side 212 from the reference line 226 is set to θ2.

As described above, the left side 212 and the right side 214 on the circular cylinder 200 can be expressed by two degrees of freedom.

Here, suppose that an angle expressing a portion onto which an image expressed by (θ2−θ1) is projected is referred to as a projection angle θ.

Figure 5:
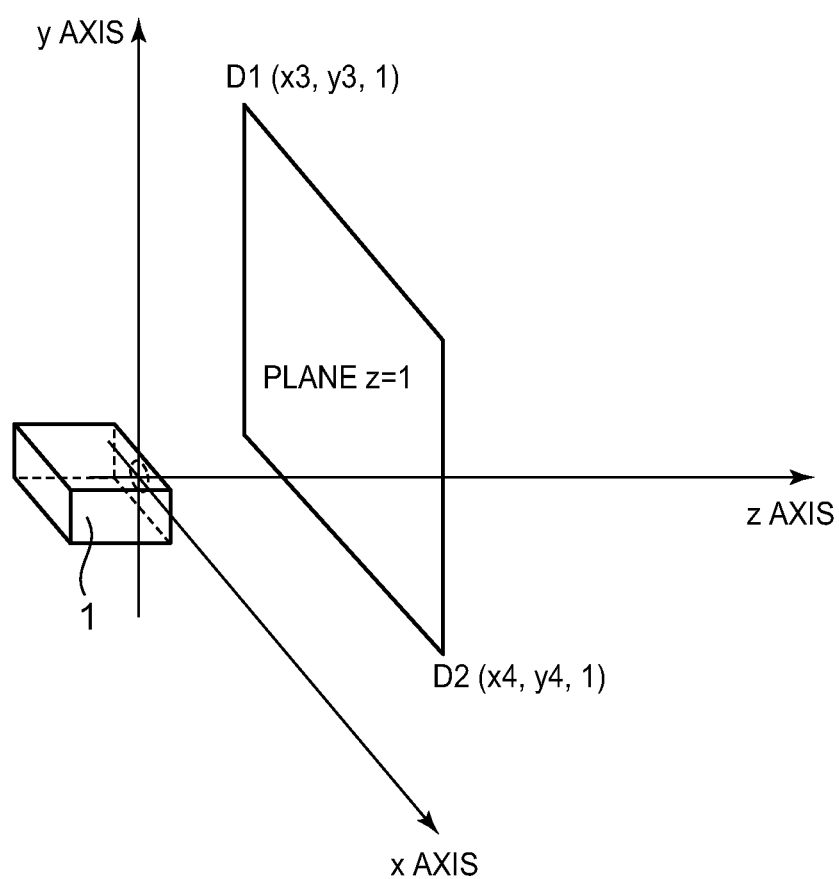
FIG. 5 is a diagram illustrating the degree of freedom of the positional relationship between the projector and the circular cylinder.

FIG. 5 is a diagram of a projection range on a plane where the z coordinate of an image that the projector 1 projects is one.

The projection range is expressed in a rectangle, so that the projection range can be expressed by four degrees of freedom in total, i.e., upper left coordinates D1 (x3, y3, 1) and lower right coordinates D2 (x4, y4, 1), for example.

As described above, in the case where an image is projected onto the circular cylinder 200 as if a sheet with a rectangular image depicted thereon is attached to the circular cylinder 200, and the right and left sides of this image are adjusted to be parallel to the center axis 202 of the circular cylinder 200, the degree of freedom of the projection state is 12 degrees in total.

In the projection state adjustment operation in which the projection of an image onto the circular cylinder 200 is adjusted as described above, the projector 1 according to the embodiment provides the projection state adjustment operation in which the user can intuitively adjust projection with a fewer number of manipulations and can accurately adjust the projection state.

As described above, since the degrees of freedom of projection onto the circular cylinder are 12 degrees, it is necessary to acquire 12 parameters in adjusting the projection state in order to accurately adjust the projection state.

Exemplary parameters for use in adjusting the projection state of the projector 1 according to the embodiment and exemplary adjustment charts for use in adjusting the projection state will be described with reference to FIGS. 6 to 9.

Adjustment charts for use in adjusting the projection state according to the embodiment are those as depicted in FIGS. 6 to 9.

All of these adjustment charts include the outer frame of the image area 101 expressing an image on the projection area 100.

Moreover, for easy understanding, the adjustment charts include grid lines provided within the outer frame.

The grid lines are provided in such a way that intervals are provided equally on an image to be projected.

Figure 2:
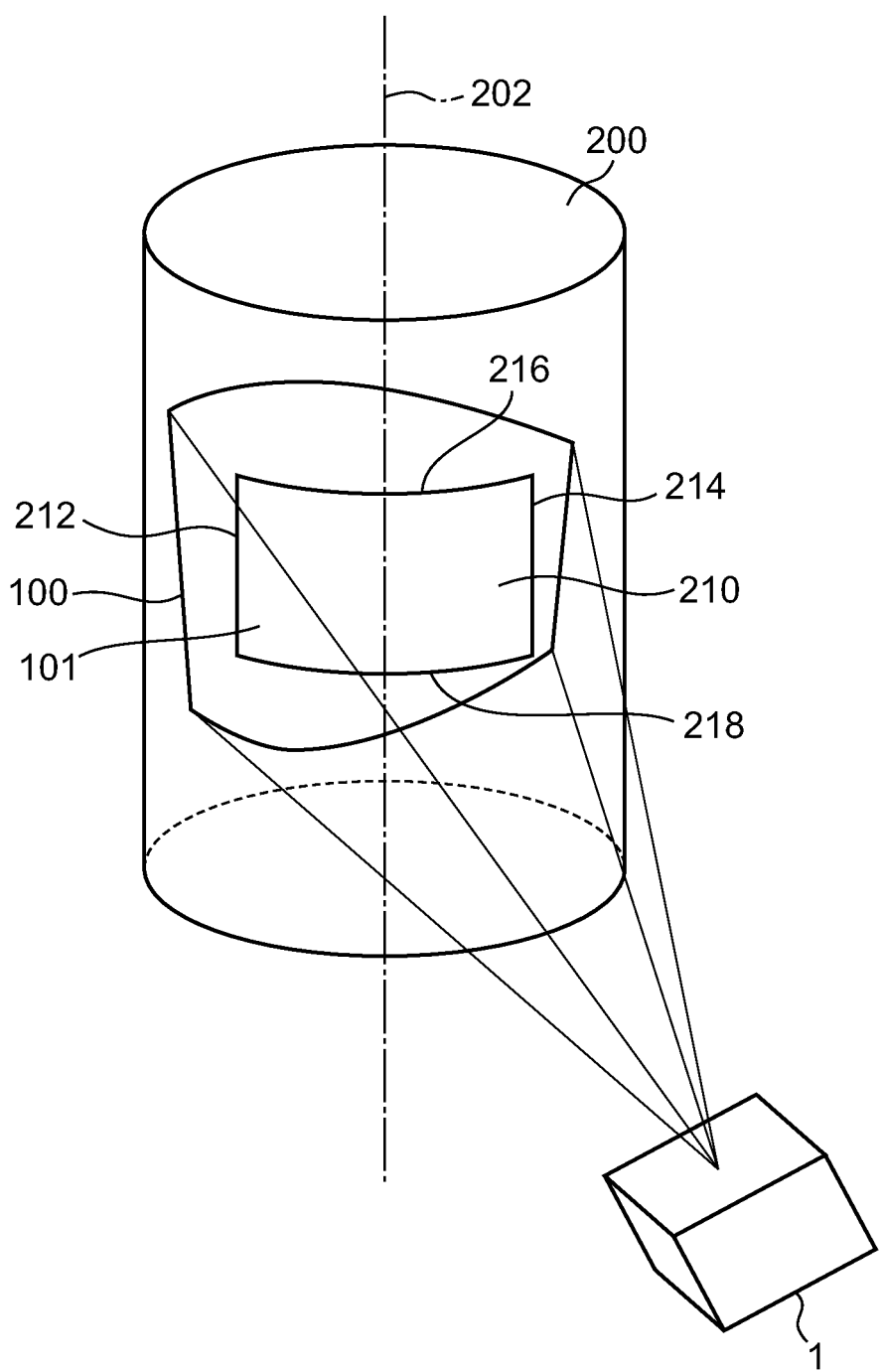
FIG. 2 is a diagram illustrating projection of an image onto a circular cylinder using a projector.

In the embodiment, adjustment markers, described later, included in the adjustment charts are adjusted so as to be matched with the corresponding locations on the target area 210, which is the area onto which the image described with reference to FIG. 2 is projected, and thus the projection state is adjusted.

Figure 6:
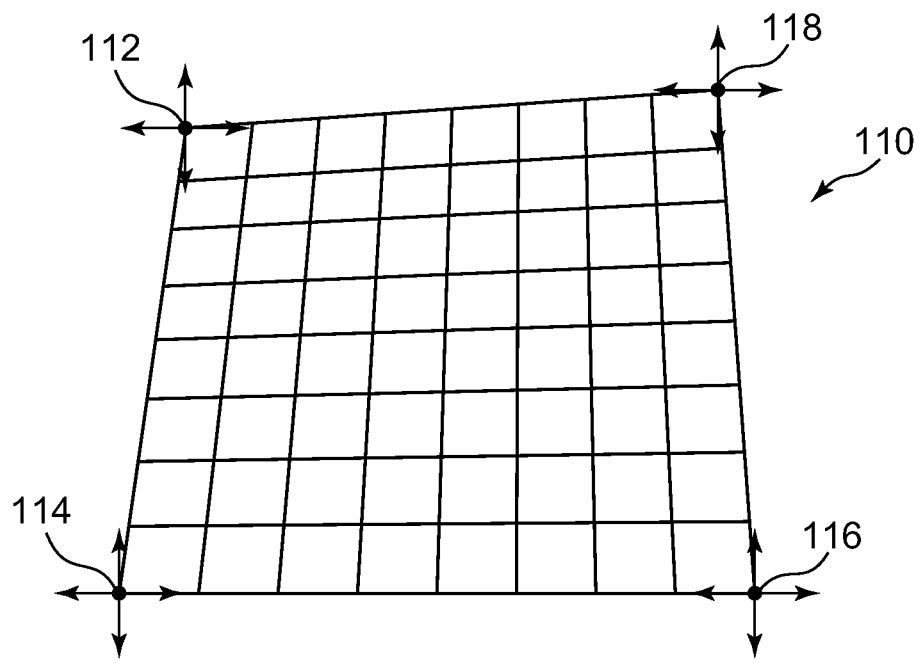
FIG. 6 is a diagram illustrating an exemplary adjustment chart according to an embodiment.

FIG. 6 is a diagram of a first adjustment chart 110.

The first adjustment chart 110 includes a first corner marker 112 expressing the upper left corner of the image area 101, a second corner marker 114 expressing the lower left corner of the image area 101, a third corner marker 116 expressing the lower right corner of the image area 101, and a fourth corner marker 118 expressing the upper right corner of the image area 101.

The projector 1 performs geometric transformation on the first adjustment chart 110 in such a way that the first corner marker 112, the second corner marker 114, the third corner marker 116, and the fourth corner marker 118 are each moved to the top, bottom, left, and right in response to user manipulations.

Since the first corner marker 112, the second corner marker 114, the third corner marker 116, and the fourth corner marker 118 each have two degrees of freedom, the first adjustment chart 110 has eight degrees of freedom in total.

That is, eight degrees of freedom out of the forgoing 12 degrees of freedom are defined using the first adjustment chart 110.

Figure 7:
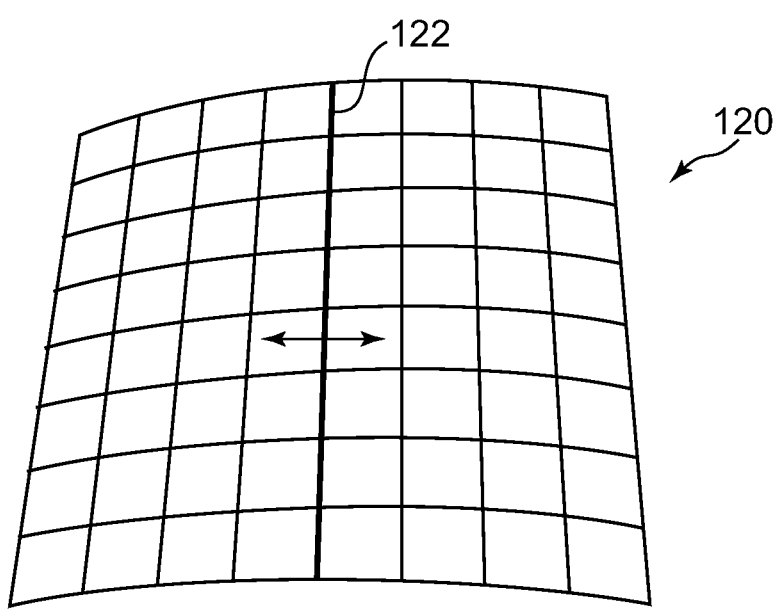
FIG. 7 is a diagram illustrating an exemplary adjustment chart according to an embodiment.

FIG. 7 is a diagram of a second adjustment chart 120.

The second adjustment chart 120 includes a median marker 122 expressing a line connecting the middle point of the projected image on the top side of the image area 101 to the middle point of the projected image on the bottom side of the image area 101.

The projector 1 performs geometric transformation on the second adjustment chart 120 in such a way that the median marker 122 is moved to the left and right in response to user manipulations.

Since the median marker 122 has one degree of freedom, the second adjustment chart 120 has one degree of freedom.

That is, one degree of freedom out of the foregoing 12 degrees of freedom is defined using the second adjustment chart 120.

Figure 8:
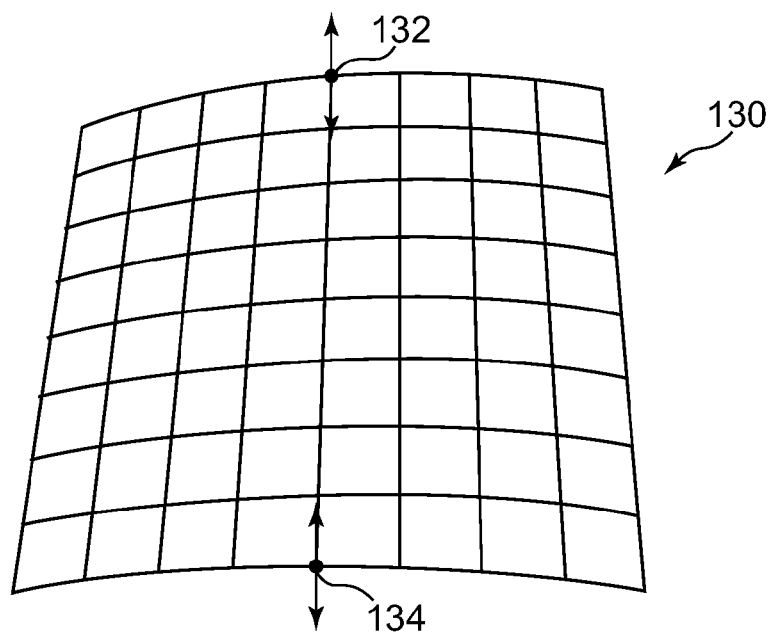
FIG. 8 is a diagram illustrating an exemplary adjustment chart according to an embodiment.

FIG. 8 is a diagram of a third adjustment chart 130.

The third adjustment chart 130 includes a top side marker 132 expressing the middle point of the projected image on the top side of the image area 101 and a bottom side marker 134 expressing the middle point of the projected image on the bottom side of the image area 101.

The projector 1 performs geometric transformation on the third adjustment chart 130 in such a way that the top side marker 132 and the bottom side marker 134 are moved vertically in response to user manipulations.

Since the top side marker 132 and the bottom side marker 134 each have one degree of freedom, the third adjustment chart 130 has two degrees of freedom in total.

That is, two degrees of freedom out of the foregoing 12 degrees of freedom are defined using the third adjustment chart 130.

Figure 9:
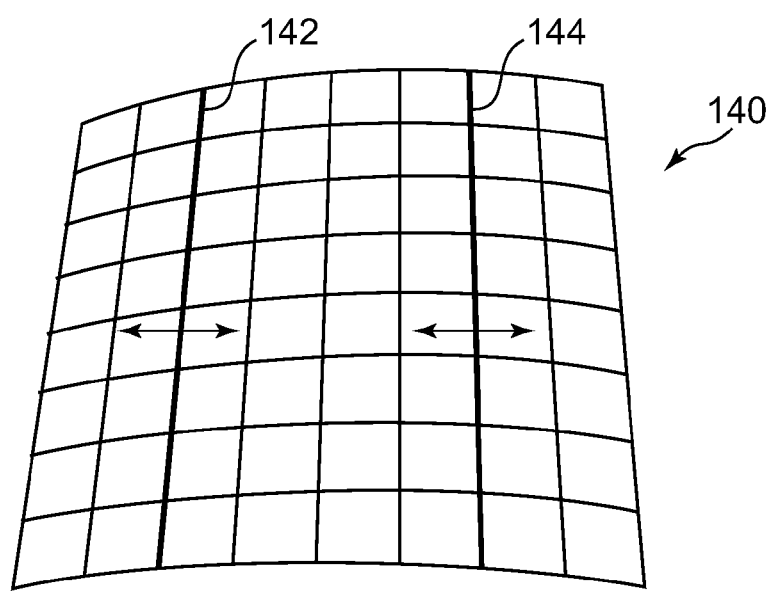
FIG. 9 is a diagram illustrating an exemplary adjustment chart according to an embodiment.

FIG. 9 is a diagram of a fourth adjustment chart 140.

The fourth adjustment chart 140 includes a one-fourth line marker 142 that is a line between the left side of the image area and the median indicated by the foregoing median marker 122, and a three-fourths line marker 144 that is a line between the right side of the image area and the foregoing median.

The projector 1 performs geometric transformation on the fourth adjustment chart 140 in such a way that the one-fourth line marker 142 and the three-fourths line marker 144 are moved to the left and right in response to user manipulations.

Here, the one-fourth line marker 142 and the three-fourths line marker 144 are configured to move symmetrically (to change the width) with the foregoing median being the center axis.

That is, since the one-fourth line marker 142 and the three-fourths line marker 144 have one degree of freedom, the fourth adjustment chart 140 has one degree of freedom.

That is, one degree of freedom out of the foregoing 12 degrees of freedom is defined using the fourth adjustment chart 140.

As described above, in the embodiment, the first adjustment chart 110, the second adjustment chart 120, the third adjustment chart 130, and the fourth adjustment chart 140 define the 12 degrees of freedom.

As a result, the projector 1 can calculate a transform function for geometric transformation necessary to accurately match the image area 101 and the target area 210 using parameters input with the adjustment charts.

As described above, for example, the median marker 122 functions as a first reference line.

For example, the one-fourth line marker 142 and the three-fourths line marker 144 function as second reference lines.

Figure 10:
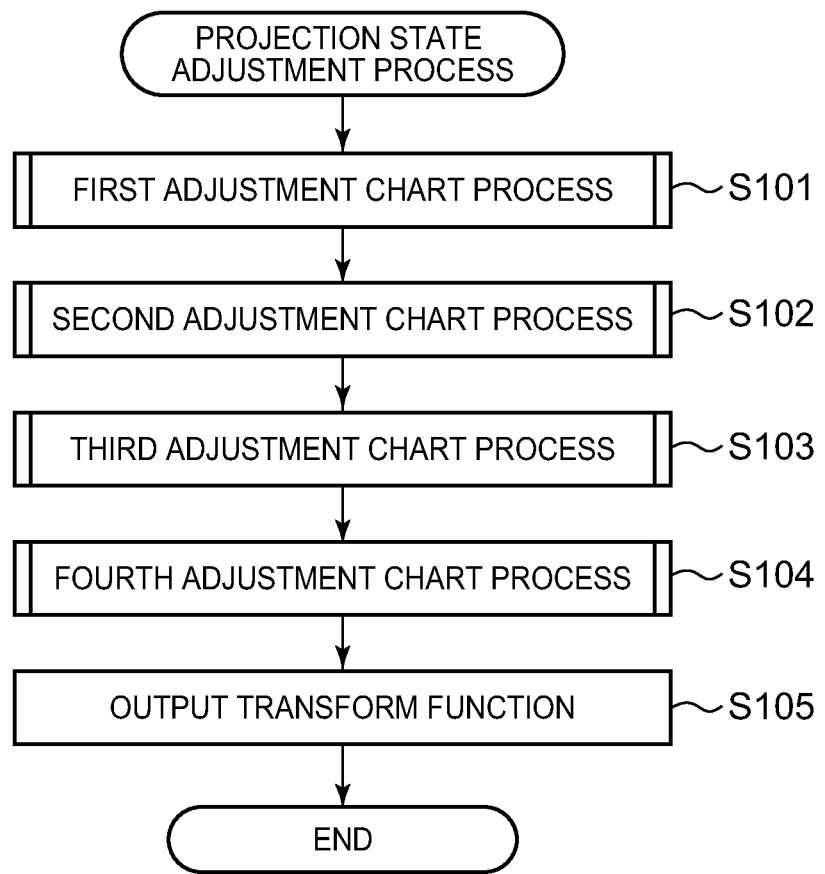
FIG. 10 is a flowchart of an exemplary projection state adjustment process according to an embodiment.

Next, a projection state adjustment process in the projector 1 according to the embodiment will be described with reference to a flowchart depicted in FIG. 10.

The projection state adjustment process is started by a user's instruction when the projector 1 is oriented toward the circular cylinder 200, for example.

In Step S101, the projection adjustment unit 40 performs a first adjustment chart process of adjusting the positions of four corners of the image area.

Figure 11:
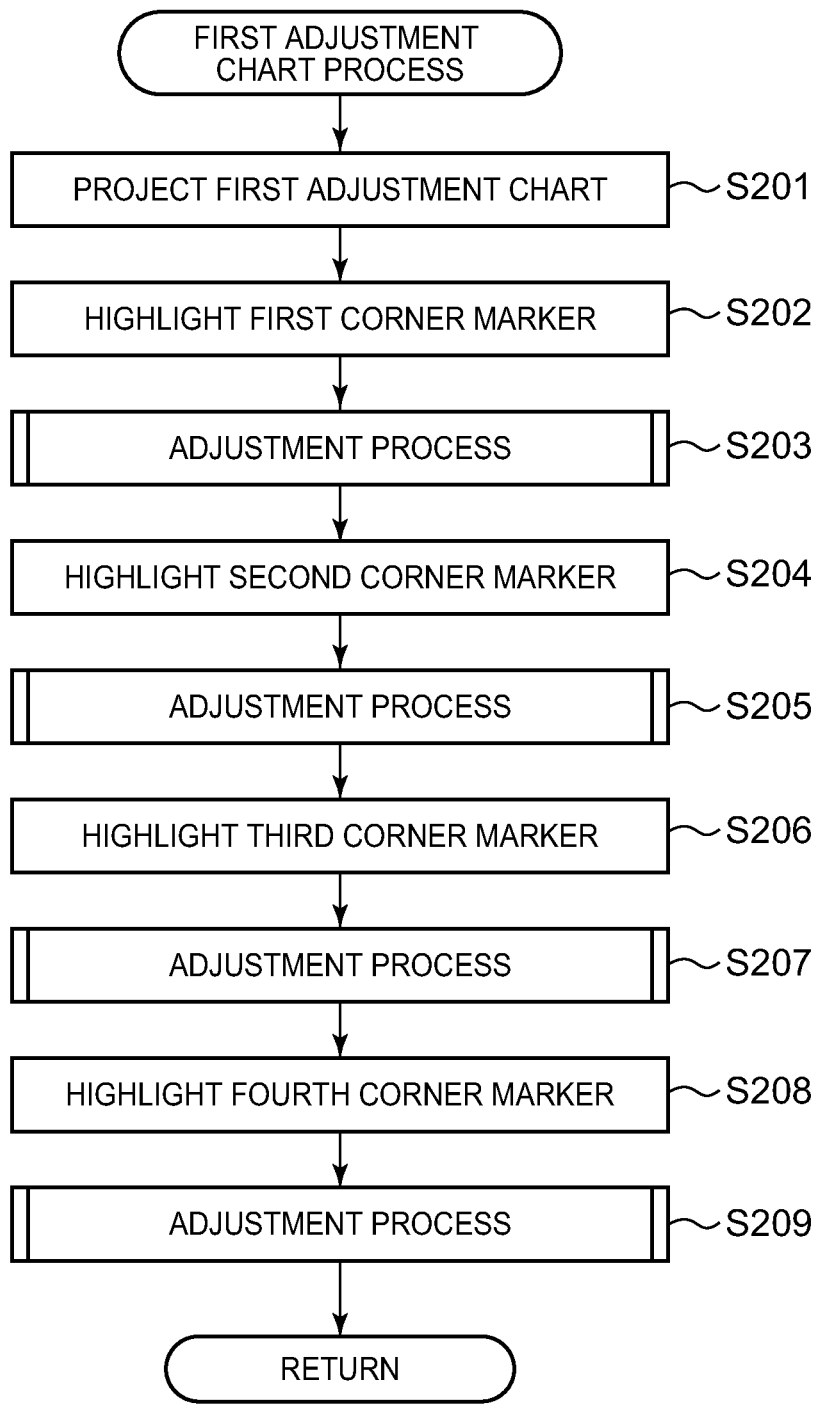
FIG. 11 is a flowchart of an exemplary first adjustment chart process according to an embodiment.

The first adjustment chart process will be described with reference to a flowchart depicted in FIG. 11.

In Step S201, the projection adjustment unit 40 projects the first adjustment chart 110.

That is, the projection adjustment unit 40 generates the first adjustment chart 110, and causes the projection processing unit 14 to project the first adjustment chart 110.

In Step S202, the projection adjustment unit 40 highlights the first corner marker 112 at the upper left on the first adjustment chart 110.

That is, the projection adjustment unit 40 generates the first adjustment chart 110 on which the first corner marker 112 is highlighted more than the other corner markers by changing the color or size of the first corner marker 112, for example, and outputs the first adjustment chart 110 to the image conversion unit 13.

The image conversion unit 13 applies image conversion to the first adjustment chart 110, and outputs the converted first adjustment chart 110 to the projection processing unit 14.

The projection processing unit 14 projects the first adjustment chart 110, which has undergone the image conversion and has been input from the image conversion unit 13.

In Step S203, the projection adjustment unit 40 performs an adjustment process on the first corner marker 112.

Figure 12:
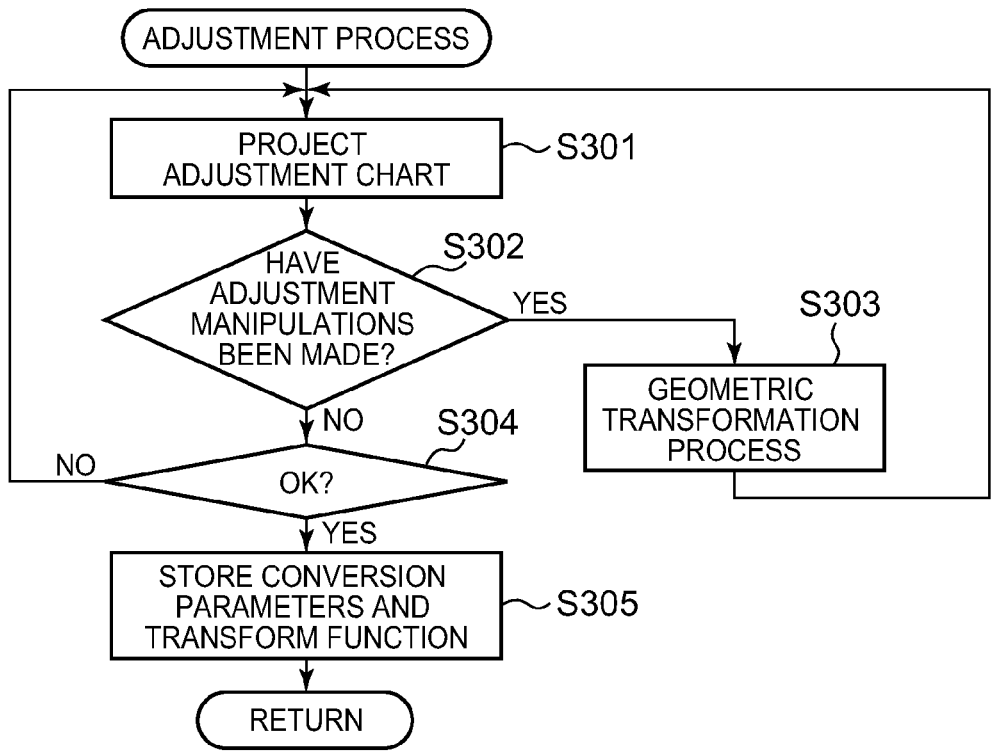
FIG. 12 is a flowchart of an exemplary adjustment process according to an embodiment.

The adjustment process will be described with reference to FIG. 12.

In Step S301, the projection adjustment unit 40 projects the adjustment chart.

In the adjustment process on the first corner marker 112, the projection adjustment unit 40 projects the first adjustment chart 110 on which the first corner marker 112 is highlighted.

In the projection, the user performs adjustment manipulations using the arrow key, for example.

For example, in the adjustment process on the first corner marker 112, the user inputs an instruction to move the first corner marker 112 to the top, bottom, left, and right using the arrow key in such a way that the position of the first corner marker 112 is matched with the top end 212-1 of the left side 212 of the target area 210.

In Step S302, the projection adjustment unit 40 determines whether the user has performed adjustment manipulations.

When the projection adjustment unit 40 determines that adjustment manipulations have been made, the process goes to Step S303.

In Step S303, the projection adjustment unit 40 causes the image conversion unit 13 to apply image conversion.

In the image conversion, the projection adjustment unit 40 determines conversion parameters based on user adjustment manipulations, and calculates a transform function for geometric transformation on the projected image based on the conversion parameters.

The projection adjustment unit 40 outputs the calculated transform function to the image conversion unit 13.

The image conversion unit 13 performs arithmetic operations on geometric transformation for the projected image based on the transform function acquired from the projection adjustment unit 40.

After that, the process returns to Step S301.

For example, in the adjustment process on the first corner marker 112, the projection adjustment unit 40 determines conversion parameters for moving the projection position of the first corner marker 112 in the direction corresponding to the pressed arrow key.

The projection adjustment unit 40 calculates a transform function to deform the first adjustment chart 110 based on the present transform function and the determined conversion parameters.

The user manipulates the arrow key in such a way that the position of the first corner marker 112 is matched with the top end 212-1 of the left side 212 of the target area 210 while seeing the first adjustment chart 110 projected onto the circular cylinder 200.

The projection adjustment unit 40 outputs the calculated transform function to the image conversion unit 13.

The image conversion unit 13 performs arithmetic operations on geometric transformation for the first adjustment chart 110 based on the transform function acquired from the projection adjustment unit 40.

In Step S301, the first adjustment chart 110 subjected to geometric transformation is projected.

In Step S302, when the projection adjustment unit 40 determines that adjustment manipulations have not been made, the process goes to Step S304.

In Step S304, the projection adjustment unit 40 determines whether the user has input OK indicating the completion of the adjustment process.

When the projection adjustment unit 40 determines that the user has not input OK, the process returns to Step S301, and the present projection is maintained.

On the other hand, when the projection adjustment unit 40 determines that the user has input OK, the process goes to Step S305.

For example, in the adjustment process on the first corner marker 112, when the position of the first corner marker 112 is matched with the top end 212-1 of the left side 212 of the target area 210, the user presses the OK button.

As described above, the conversion parameters on geometric transformation for the adjustment chart are sequentially acquired in response to user adjustment manipulations until the user presses the OK button, and a transform function is calculated from the conversion parameters.

Moreover, geometric transformation is applied to the adjustment chart using the calculated transform function, and the adjustment chart subjected to the geometric transformation is projected.

In Step S305, the projection adjustment unit 40 stores the conversion parameters on the geometric transformation process in the previous Step S303 in the parameter storage unit 43, and records the transform function in the transform function storage unit 45.

After the recording, the adjustment process is ended, and the process returns to the first adjustment chart process.

Referring again to FIG. 11, the description is continued on the first adjustment chart process.

After the adjustment process in Step S203, the process goes to Step S204.

In Step S204, the projection adjustment unit 40 ends highlighting the first corner marker 112, and highlights the second corner marker 114 at the lower left.

That is, the projection adjustment unit 40 generates the first adjustment chart 110 on which the second corner marker 114 is highlighted, and outputs the first adjustment chart 110 to the projection processing unit 14 through the image conversion unit 13 for projecting the first adjustment chart 110.

In Step S205, the projection adjustment unit 40 performs an adjustment process on the second corner marker 114.

The adjustment process is similar to the case of the first corner marker 112.

That is, the user manipulates the arrow key in such a way that the second corner marker 114 is matched with the lower end 212-2 of the left side 212 of the target area 210.

The projection adjustment unit 40 calculates a transform function for geometric transformation to deform the first adjustment chart 110 in such a way that the projection position of the second corner marker 114 is moved to the top, bottom, left, and right in response to pressing of the arrow key.

The image conversion unit 13 performs geometric transformation on the first adjustment chart 110 based on the calculated transform function.

When the position of the second corner marker 114 is matched with the lower end 212-2 of the left side 212 of the target area 210, the user presses the OK button.

The conversion parameters and the transform function at this time are recorded, and then the adjustment process is ended.

In Step S206, the projection adjustment unit 40 ends highlighting the second corner marker 114, and highlights the third corner marker 116 at the lower right.

In Step S207, the projection adjustment unit 40 performs an adjustment process on the third corner marker 116.

The adjustment process is similar to the case of the first corner marker 112.

That is, the user manipulates the arrow key in such a way that the third corner marker 116 is matched with the lower end 214-2 of the right side 214 of the target area 210.

The projection adjustment unit 40 calculates a transform function for geometric transformation to deform the first adjustment chart 110 in such a way that the projection position of the third corner marker 116 is moved to the top, bottom, left, and right in response to pressing of the arrow key.

The image conversion unit 13 performs geometric transformation on the first adjustment chart 110 based on the calculated transform function.

When the position of the third corner marker 116 is matched with the lower end 214-2 of the right side 214 of the target area 210, the user presses the OK button.

The conversion parameters and the transform function at this time are recorded, and then the adjustment process is ended.

In Step S208, the projection adjustment unit 40 ends highlighting the third corner marker 116, and highlights the fourth corner marker 118 at the upper right.

In Step S209, the projection adjustment unit 40 performs an adjustment process on the fourth corner marker 118.

The adjustment process is similar to the case of the first corner marker 112.

That is, the user manipulates the arrow key in such a way that the fourth corner marker 118 is matched with the top end 214-1 of the right side 214 of the target area 210.

The projection adjustment unit 40 calculates a transform function for geometric transformation to deform the first adjustment chart 110 in such a way that the projection position of the fourth corner marker 118 is moved to the top, bottom, left, and right in response to pressing of the arrow key.

The image conversion unit 13 performs geometric transformation on the first adjustment chart 110 based on the calculated transform function.

When the position of the fourth corner marker 118 is matched with the top end 214-1 of the right side 214 of the target area 210, the user presses the OK button.

The conversion parameters and the transform function at this time are recorded, and then the adjustment process is ended.

As described above, the first adjustment chart process is ended, and the process returns to the projection state adjustment process.

Figure 13:
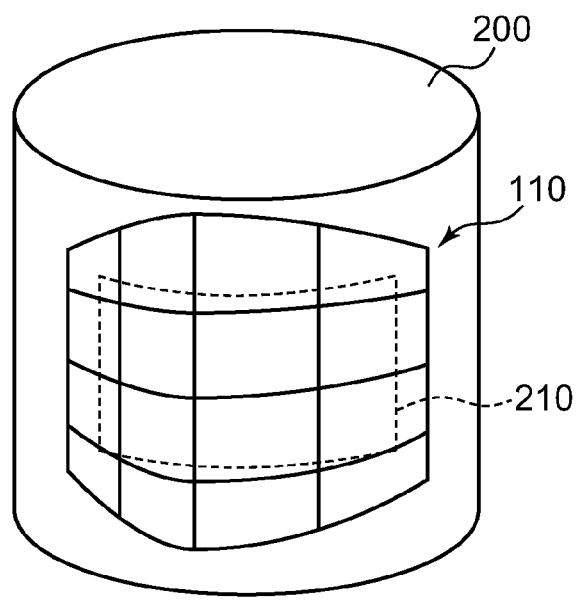
FIG. 13 is a diagram of an exemplary projection state of an adjustment chart onto the circular cylinder before the projection state adjustment process.

For example, suppose that the first adjustment chart 110 is first projected as depicted in FIG. 13.

Here, on the chart depicted in FIG. 13, for simplicity, the number of grids within the outer frame is half the number of grids on the chart depicted in FIG. 6 vertically and horizontally.

Moreover, the markers are not displayed on the chart.

In FIG. 13, broken lines indicate the target area 210.

These also apply in FIGS. 14, 16, 18, and 20 below.

Figure 14:
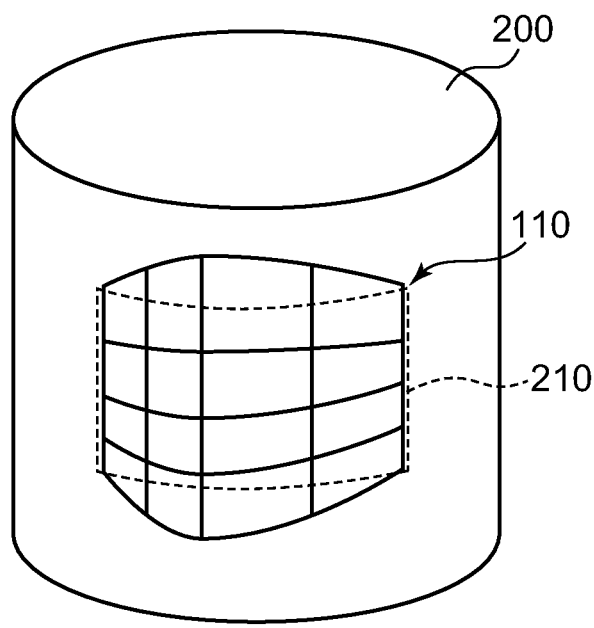
FIG. 14 is a diagram of an exemplary projection state of an adjustment chart onto the circular cylinder after the first adjustment chart process.

According to the first adjustment chart process described above, the first adjustment chart 110 projected as depicted in FIG. 13 is turned into the state in which the positions of four corners are matched with the positions of four corners of the target area 210 as depicted in FIG. 14.

Referring again to FIG. 10, the description is continued.

After the first adjustment chart process, in Step S102, the projection adjustment unit 40 performs a second adjustment chart process.

Figure 15:
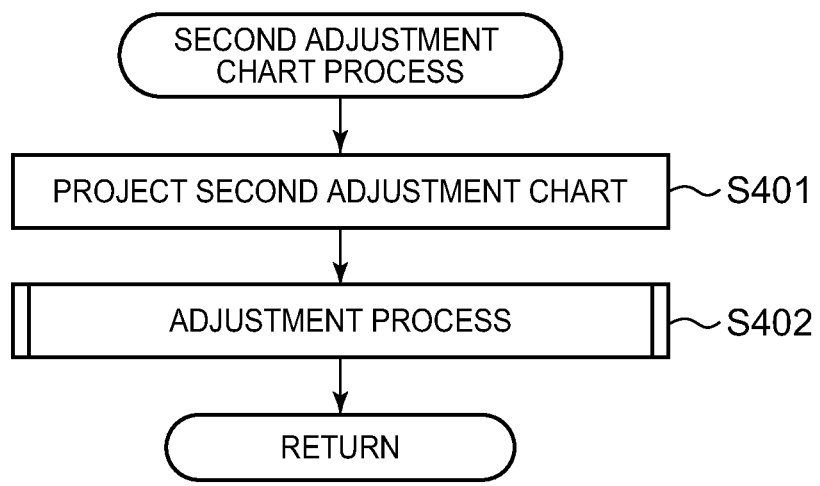
FIG. 15 is a flowchart of an exemplary second adjustment chart process according to an embodiment.

An exemplary second adjustment chart process will be described with reference to FIG. 15.

Although the second adjustment chart process is different in the adjustment chart and the markers for use, the second adjustment chart process is basically similar to the first adjustment chart process.

In Step S401, the projection adjustment unit 40 projects the second adjustment chart 120 including the median marker 122.

In Step S402, the projection adjustment unit 40 performs an adjustment process on the median marker 122.

The user manipulates the left and right keys of the arrow key in such a way that the median marker 122 is positioned in the middle between the left side 212 and the right side 214 of the target area 210.

The projection adjustment unit 40 calculates a transform function for geometric transformation to deform the second adjustment chart 120 in such a way that the projection position of the median marker 122 is moved to the left and right in response to pressing of the left and right keys.

The image conversion unit 13 performs geometric transformation on the second adjustment chart 120 based on the calculated transform function.

When the position of the median marker 122 is positioned in the middle between the left side 212 and the right side 214, the user presses the OK button.

The conversion parameters and the transform function at this time are recorded, and then the adjustment process is ended.

Figure 16:
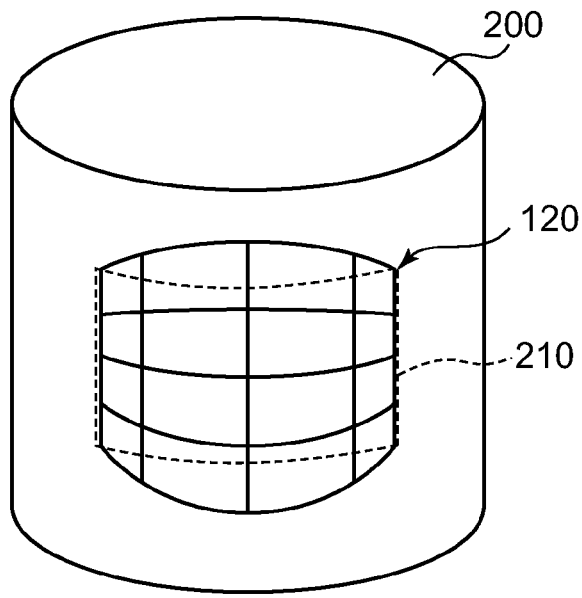
FIG. 16 is a diagram of an exemplary projection state of an adjustment chart onto the circular cylinder after the second adjustment chart process.

For example, according to the second adjustment chart process, the adjustment chart projected as depicted in FIG. 14 is turned as depicted in FIG. 16.

That is, the center in the lateral direction of the second adjustment chart 120, which is the projected image, is matched with the center of the target area 210 in the lateral direction.

Referring again to FIG. 10, the description is continued.

After the second adjustment chart process, in Step S103, the projection adjustment unit 40 performs a third adjustment chart process.

Figure 17:
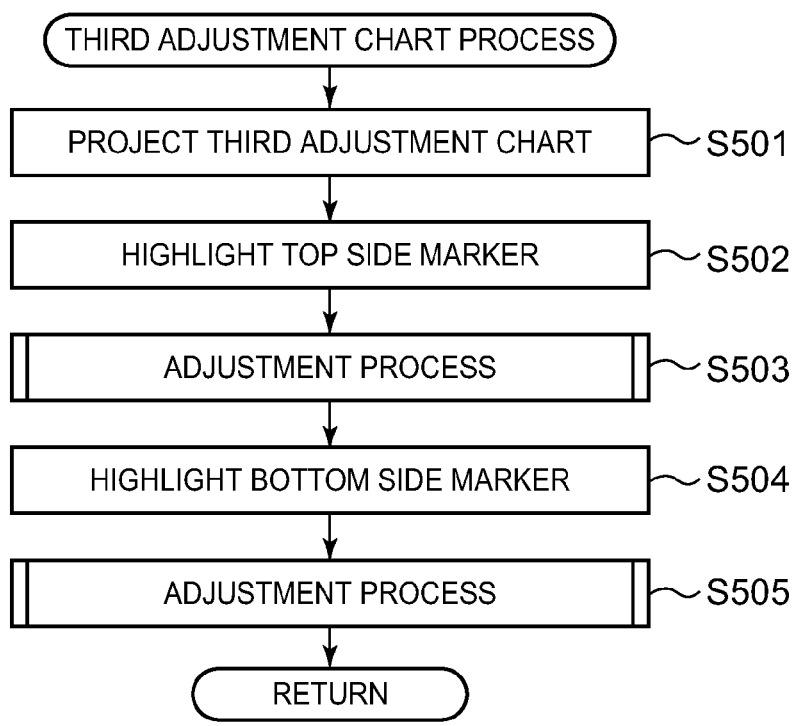
FIG. 17 is a flowchart of an exemplary third adjustment chart process according to an embodiment.

An exemplary third adjustment chart process will be described with reference to FIG. 17.

Although the third adjustment chart process is different in the adjustment chart and the markers for use, the third adjustment chart process is basically similar to the first adjustment chart process.

In Step S501, the projection adjustment unit 40 projects the third adjustment chart 130.

In Step S502, the projection adjustment unit 40 highlights the top side marker 132 on the third adjustment chart 130.

In Step S503, the projection adjustment unit 40 performs an adjustment process on the top side marker 132.

The user manipulates the up and down keys of the arrow key in such a way that the top side marker 132 is at the same height as the middle point of the top side 216 of the target area 210, that is, the top side marker 132 is matched with the middle point of the top side 216.

The projection adjustment unit 40 calculates a transform function for geometric transformation to deform the third adjustment chart 130 in such a way that the projection position of the top side marker 132 is moved vertically in response to pressing of the up and down keys.

The image conversion unit 13 performs geometric transformation on the third adjustment chart 130 based on the calculated transform function.

When the position of the top side marker 132 is at the same height as the middle point of the top side 216 of the target area 210, the user presses the OK button.

The conversion parameters and the transform function at this time are recorded, and then the adjustment process is ended.

In Step S504, the projection adjustment unit 40 highlights the bottom side marker 134 on the third adjustment chart 130.

In Step S505, the projection adjustment unit 40 performs an adjustment process on the bottom side marker 134.

The user manipulates the up and down keys of the arrow key in such a way that the bottom side marker 134 is at the same height as the bottom side 218 of the target area 210, that is, the bottom side marker 134 is matched with the middle point of the bottom side 218.

The projection adjustment unit 40 calculates a transform function for geometric transformation to deform the third adjustment chart 130 in such a way that the projection position of the bottom side marker 134 is moved vertically in response to pressing of the up and down keys.

The image conversion unit 13 performs geometric transformation on the third adjustment chart 130 based on the calculated transform function.

When the position of the bottom side marker 134 is at the same height as the middle point of the bottom side 218 of the target area 210, the user presses the OK button.

The conversion parameters and the transform function at this time are recorded, and then the adjustment process is ended.

As described above, the third adjustment chart process is ended, and the process returns to the projection state adjustment process.

Figure 18:
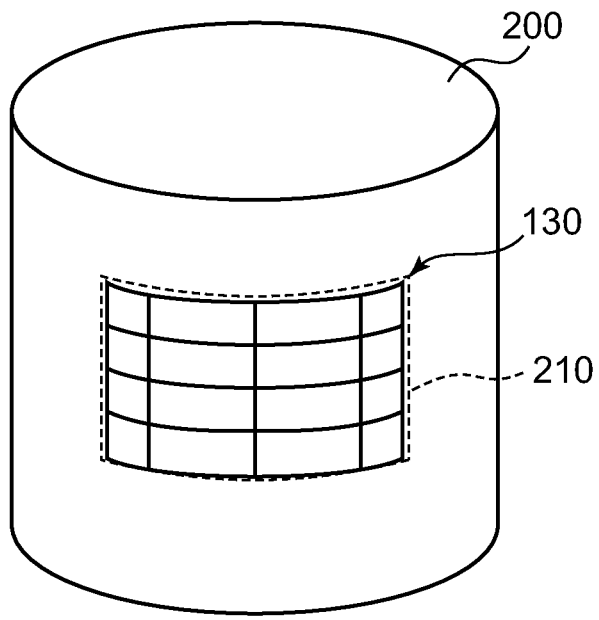
FIG. 18 is a diagram of an exemplary projection state of an adjustment chart onto the circular cylinder after the third adjustment chart process.

For example, according to the third adjustment chart process, the adjustment chart projected as in FIG. 16 is turned as depicted in FIG. 18.

It is noted that the order of performing the second adjustment chart process and the third adjustment chart process can be changed.

Moreover, the user may finely adjust the adjustment chart while repeating the second adjustment chart process and the third adjustment chart process.

Adjustment using the second adjustment chart process and the third adjustment chart process is performed to match four corners of the target area 210 and four corners of the image area 101, which are on the outer frame of the adjustment chart.

Additionally, the middle point (the top side marker 132) of the top side of the image area 101 is matched with the middle point of the top side 216 of the target area 210, and the middle point (the bottom side marker 134) of the bottom side of the image area 101 is matched with the middle point of the bottom side 218 of the target area 210.

It is noted that in some cases, the top side of the image area 101 is not completely matched with the top side 216 of the target area 210 and the bottom side of the image area 101 is not completely matched with the bottom side 218 of the target area 210 even though the second adjustment chart process and the third adjustment chart process are performed.

Referring again to FIG. 10, the description is continued.

After the third adjustment chart process, in Step S104, the projection adjustment unit 40 performs a fourth adjustment chart process.

Figure 19:
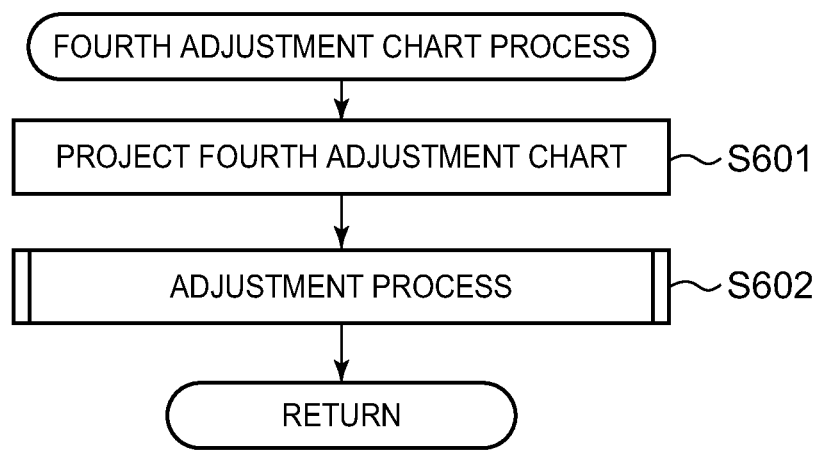
FIG. 19 is a flowchart of an exemplary fourth adjustment chart process according to an embodiment.

An exemplary fourth adjustment chart process will be described with reference to FIG. 19.

Although the fourth adjustment chart process is different in the adjustment chart and the markers for use, the fourth adjustment chart process is basically similar to the first adjustment chart process.

In Step S601, the projection adjustment unit 40 projects the fourth adjustment chart 140 including the one-fourth line marker 142 and the three-fourths line marker 144.

In Step S602, the projection adjustment unit 40 performs an adjustment process on the one-fourth line marker 142 and the three-fourths line marker 144.

The user manipulates the left and right keys of the arrow key in such a way that the one-fourth line marker 142 is positioned in the middle between the left side 212 of the target area 210 and the median adjusted in the third adjustment chart process and the three-fourths line marker 144 is positioned in the middle between the right side 214 of the target area 210 and the median.

The projection adjustment unit 40 calculates a transform function for geometric transformation to deform the fourth adjustment chart 140 in such a way that the projection positions of the one-fourth line marker 142 and the three-fourths line marker 144 are moved to the left and right in response to pressing of the left and right keys.

The image conversion unit 13 performs geometric transformation on the fourth adjustment chart 140 based on the calculated transform function.

Here, the one-fourth line marker 142 and the three-fourths line marker 144 are moved together symmetrically with respect to the median.

When the positions of the one-fourth line marker 142 and the three-fourths line marker 144 are at desired positions, the user presses the OK button.

The conversion parameters and the transform function at this time are recorded, and then the adjustment process is ended.

Figure 20:
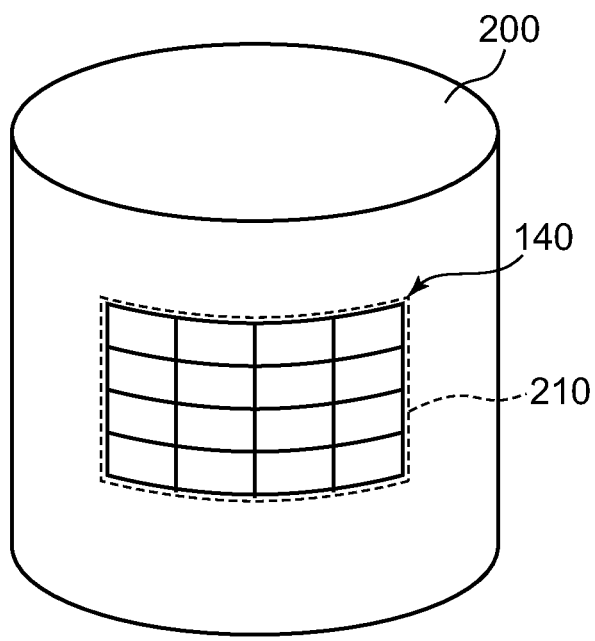
FIG. 20 is a diagram of an exemplary projection state of an adjustment chart onto the circular cylinder after the fourth adjustment chart process.

For example, according to the foregoing fourth adjustment chart process, the adjustment chart projected as in FIG. 18 is turned as depicted in FIG. 20.

That is, the image area 101, which is the outer frame of the fourth adjustment chart 140 and the projected image, is completely matched with the outer frame of the target area 210, and images to be projected at even intervals, for example, in the image area are projected at even intervals.

That is, the images are projected as if a sheet with a rectangular image depicted thereon is attached to the circular cylinder.

Referring again to FIG. 10, the description is continued.

After the fourth adjustment chart process, in Step S105, the projection adjustment unit 40 outputs a transform function finally calculated based on 12 conversion parameters obtained as a result of the first to fourth adjustment chart processes.

The transform function is used for geometric transformation at the image conversion unit 13 in image projection until the transform function is canceled.

The transform function is stored in the transform function storage unit 45 in association with the adjustment date and the setting name.

As described above, the projection state adjustment process is ended.

The transform function recorded in the transform function storage unit 45 is read by the transform function reading unit 46 any time and output to the image conversion unit 13 for use in image conversion at the image conversion unit 13.

Therefore, for example, the positional relationship between the projector 1 frequently used and the circular cylinder 200 is adjusted once for the projection state. When the transform function is once found, the projection state adjustment process may not be performed for second time and later.

At this time, the transform function reading unit 46 reads the transform function stored in the transform function storage unit 45, and the projector 1 can immediately project images correctly onto a desired area.

Next, geometric transformation performed in the adjustment process will be described with reference to FIGS. 21A to 21D.

It can be considered that geometric transformation performed in the embodiment is divided into two image conversion processes.

Figure 21A:
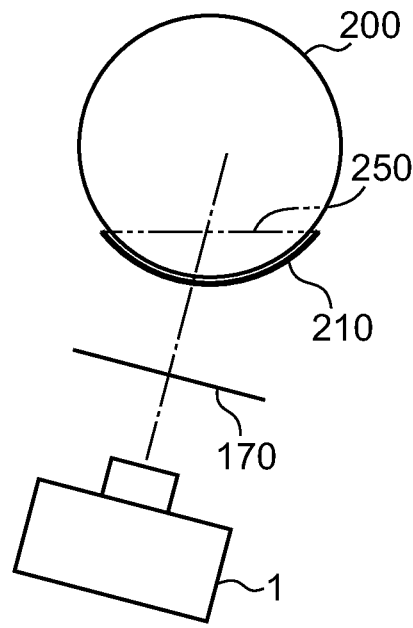
FIGS. 21A to 21D are diagrams illustrating a first transformation and a second transformation in the projection state adjustment process according to an embodiment.

As depicted in FIG. 21A, let us consider geometric transformation in the case where the projector 1 projects an image onto the target area 210 on the circular cylinder 200.

As indicated by a two-dot chain line in FIG. 21A, suppose that a plane passing through the right side and the left side of the target area 210 is referred to as a cut plane 250.

Moreover, suppose that a plane perpendicular to the projection direction of the projector 1 is referred to as a projection plane 170.

Generally, as depicted in FIG. 21A, the cut plane 250 and the projection plane 170 are not parallel to each other.

Figure 21B:
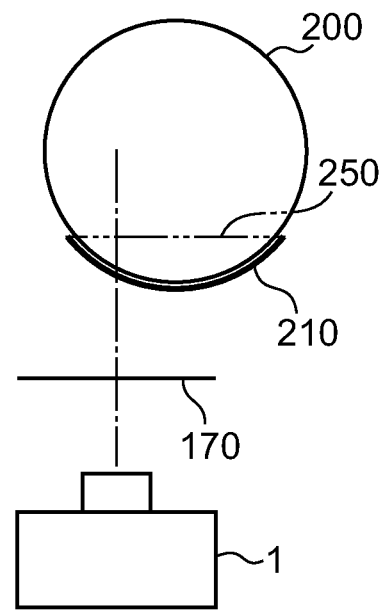

On the other hand, as depicted in FIG. 21B, in the case where the cut plane 250 and the projection plane 170 are parallel to each other, geometric transformation from the projection plane 170 to the target area 210 is relatively easily performed.

Figure 21C:
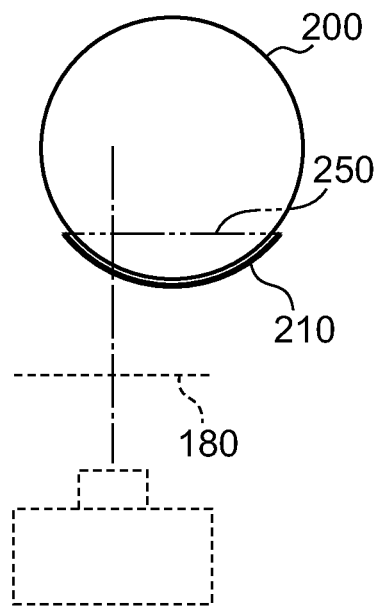

Therefore, in the embodiment, in the case where the cut plane 250 and the projection plane 170 are not parallel to each other, let us consider an intermediate plane 180 parallel to the cut plane 250, as depicted in FIG. 21C.

Geometric transformation from the intermediate plane 180 to the target area 210 is a first transformation.

For example, suppose that four variables for the center (Ox, Oy, Oz) of the circular cylinder 200 and the projection angle θ expressing the width of the target area are variables expressing the circular cylinder 200. The variables can be determined from the move parameter of the median marker 122 in the lateral direction, the move parameter of the top side marker 132 in the vertical direction, the move parameter of the bottom side marker 134 in the vertical direction, and a half value of the value of the projection angle θ expressing the width of the target area indicated by the one-fourth line marker 142 and the three-fourths line marker 144.

Figure 21D:
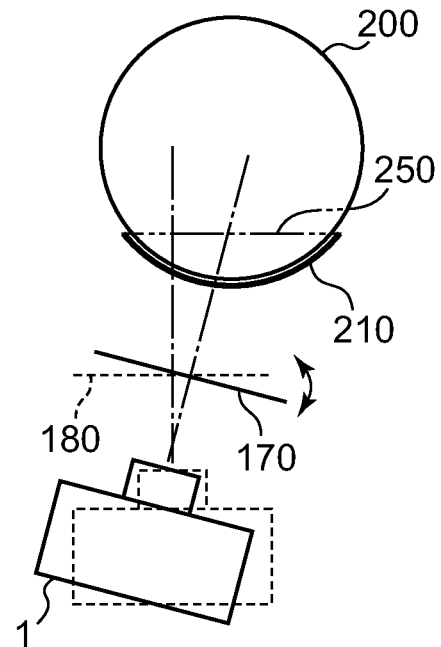

Moreover, as depicted in FIG. 21D, conversion from the projection plane 170 to the intermediate plane 180 is a second transformation.

This second transformation is rotation projection transformation from a plane to a plane generally known.

The transformation formula of the rotation projection transformation can be determined from the coordinates of four corners of the image area 101 determined using the first adjustment chart 110.

Figure 22:
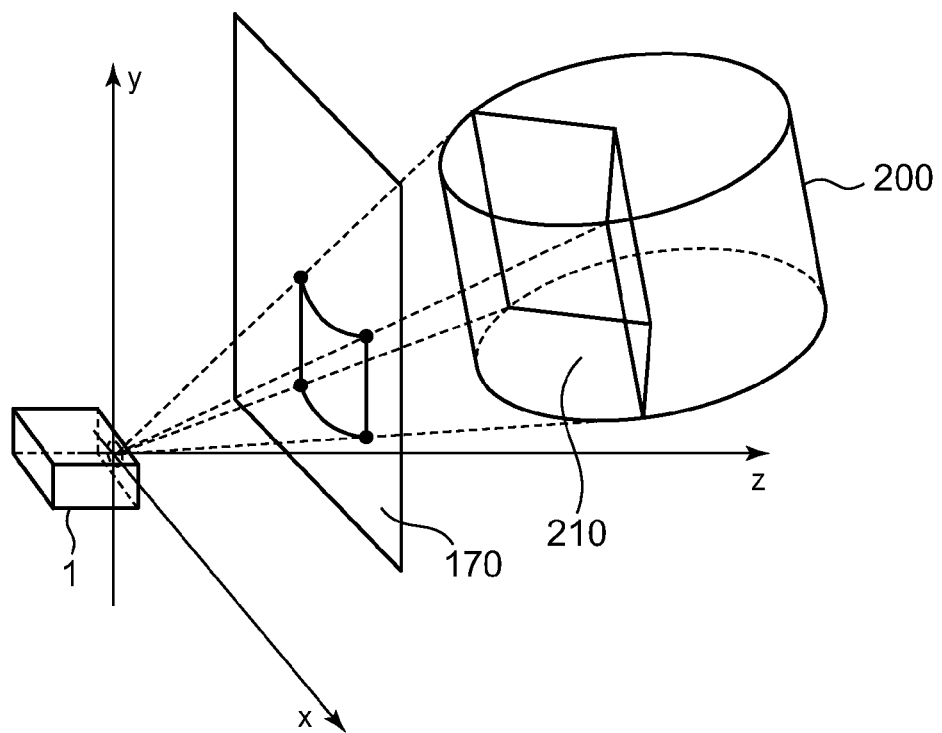
FIG. 22 is a diagram illustrating projection of an image onto a circular cylinder using the projector according to an embodiment.

In the embodiment, geometric transformation from the projection plane 170 to the target area 210 as depicted in FIG. 22 is performed by two transformations, i.e., the first transformation and the second transformation described above.

Here, the parameters of the first transformation can be obtained by the second adjustment chart process using the second adjustment chart 120, the third adjustment chart process using the third adjustment chart 130, and the fourth adjustment chart process using the fourth adjustment chart 140.

Furthermore, the parameters of the second transformation can be obtained by the first adjustment chart process using the first adjustment chart 110.

As described above, for example, the cut plane 250 corresponds to a third plane, and the first transformation corresponds to circular cylinder geometric transformation between the target area and the plane parallel to the third plane.

According to the projection state adjustment process of the embodiment, 12 variables can be found by mathematically completely solving the 12 variables based on inputs made by adjustment manipulations using the first to fourth adjustment charts, so that the transformation formula of accurate geometric transformation necessary for projection can be determined.

Moreover, 12 parameters input to solve the 12 variables include the positions of four corners of the image area 101, the positions of the top side and the bottom side in the vertical direction, the position of the median in the lateral direction, and the interval between the one-fourth line and the three-fourths line.

These parameters can be grasped by the user much more intuitively than the case where the user directly inputs the positional relationship between the projector 1 and the circular cylinder 200, the projection angle θ expressing the target area, and so on, for example.

Therefore, according to the embodiment, the user can intuitively perform manipulations in adjusting the projection state.

Moreover, the fact that the adjustment chart is updated in real time in response to the user input also facilitates manipulates by intuition.

Furthermore, since it is only necessary to input a minimum necessary amount of parameters, i.e., the 12 parameters, the number of manipulations for adjustment is small for the user.

According to the embodiment, therefore, the user can intuitively, easily, and accurately adjust the projection state.

In addition, geometric transformation is determined in such a way that the transformation process is separated into the first transformation and the second transformation as in the embodiment, so that the amount of arithmetic operations is reduced.

This is effective for high-speed processing. In the embodiment, the combination of the first adjustment chart 110 corresponding to the first transformation and the second adjustment chart 120, the third adjustment chart 130, and the fourth adjustment chart 140 corresponding to the second transformation is used to easily separate geometric transformation into the first transformation and the second transformation.

It is noted that in the embodiment, for example, the first to fourth adjustment chart processes are performed sequentially. However, the first to fourth adjustment chart processes may be appropriately returned or skipped depending on the user's instruction.

Moreover, the order of procedures in each process, such as the first adjustment chart process, can be similarly changed.

In the embodiment, the description has been made in which the user inputs all of unknown 12 parameters.

However, the projection adjustment unit 40 can acquire values related to a part of parameters even though the user does not always input these parameters.

For example, the projection adjustment unit 40 can acquire the angle of view of the projection lens 20 from a sensor provided on the projection lens 20 or from a control unit controlling the projection lens 20.

Furthermore, the projection adjustment unit 40 can acquire the posture of the projector 1, for example, from the foregoing posture sensor 29.

The projection adjustment unit 40 may acquire the diameter of the circular cylinder 200 input to the operation unit 28 by the user or acquire the positional relationship between the optical axis of the projector 1 and the circular cylinder 200.

Even though some of the 12 parameters are not input, all the 12 degrees of freedom are calculated and an accurate transform function can be acquired, as long as the values of the parameters are acquired.

That is, user manipulations necessary for adjustment can be reduced.

As described above, for example, the portion where the angle of view of the projection lens 20 is acquired and the posture sensor 29 function as a condition acquiring unit to acquire the positional relationship between the projection unit and the target area, but the portion and the posture sensor 29 are not necessarily included in the configuration.

For example, arithmetic operations for bilaterally symmetrical parameters can be reduced in the conversion parameters acquired using the first to fourth adjustment charts, as long as it is apparent that the projector 1 is disposed directly opposite to the circular cylinder 200.

In this case, for example, the corner markers on the first adjustment chart may be moved in bilateral symmetry, and adjustment to be made by the third adjustment chart becomes unnecessary.

Moreover, adjustment to be made by the fourth adjustment chart becomes unnecessary as long as the projection angle θ is apparent.

In the embodiment, an example has been described in which an image is projected onto the right circular cylinder. However, the case where an image is projected onto an oblique circular cylinder is also similar to the description above, as long as the left and right sides of the target area are parallel to the axis of the oblique circular cylinder.

Figure 23:
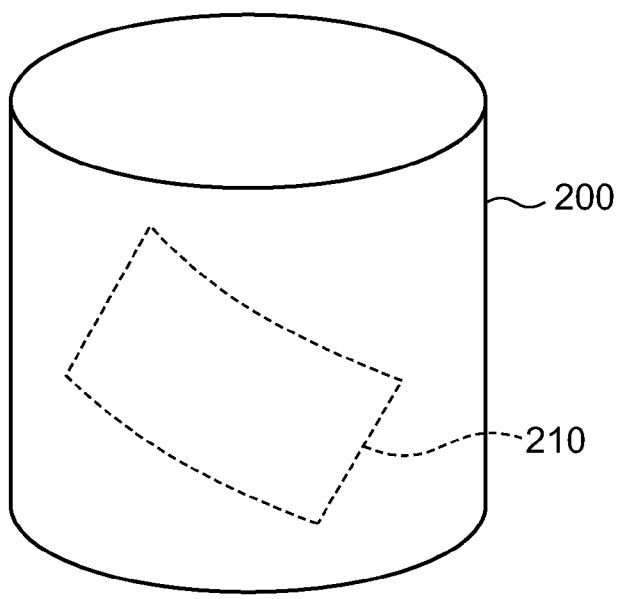
FIG. 23 is a diagram illustrating projection of an image onto a circular cylinder according to an exemplary modification of an embodiment.

Furthermore, in the embodiment, the conditions are given that the right and left sides of the target area 210 are parallel to the axis of the circular cylinder 200. However, for example, as depicted in FIG. 23, the target area 210 may be rotated with respect to the axis of the circular cylinder.

In this case, there are 13 conversion parameters.

In this case, for example, a chart can be used, as a fifth adjustment chart, to adjust this rotation angle.

Although the number of conversion parameters is increased, a variety of projection is made possible.

In addition, in the embodiment, an example has been described in which an image is projected onto the protruding curved surface of a circular cylinder.

Figure 24:
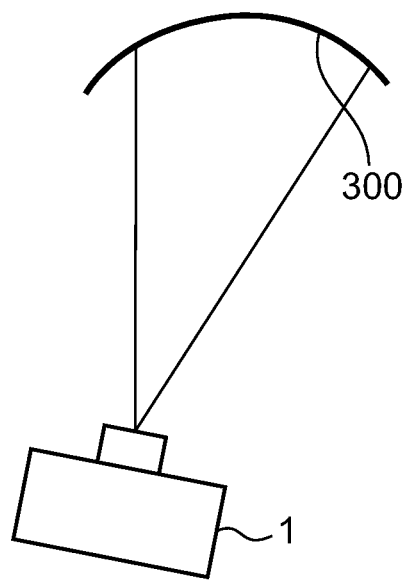
FIG. 24 is a diagram illustrating projection of an image onto a curved surface according to an exemplary modification of an embodiment.

However, as depicted in FIG. 24, also the case where an image is projected onto a recessed curved surface 300 forming a part of a circumferential surface can be operated similarly to the foregoing embodiment, not limited to the protruding curved surface.

In the projection, it is not necessary to change the settings of the projector 1.

That is, the user can adjust the projection state by completely the same manipulates without regard to whether the cylinder is circular or recessed.

Moreover, in the embodiment, an example has been shown in which an image is projected onto a curved surface. However, the projection adjustment unit 40 can also be used for adjusting the projection state in the case where an image is projected onto a plane (which corresponds to a circular cylinder surface with an infinite radius).

In this case, the first adjustment chart process alone may be performed in which the first adjustment chart 110 is used to match four corners of the image area and four corners of the target area, and it is not necessary to perform the second to fourth adjustment chart processes.

That is, the second transformation alone may be performed between the foregoing first transformation and second transformation.

In adjustment using the adjustment chart, a position guide mark may be displayed near the center of the adjustment chart in such a way that the user can clearly recognize which point the user is currently adjusting or the user can recognize the direction of a peripheral part of the adjustment chart even in the case where the peripheral part is out of the circular cylinder and not projected.

Figure 25:
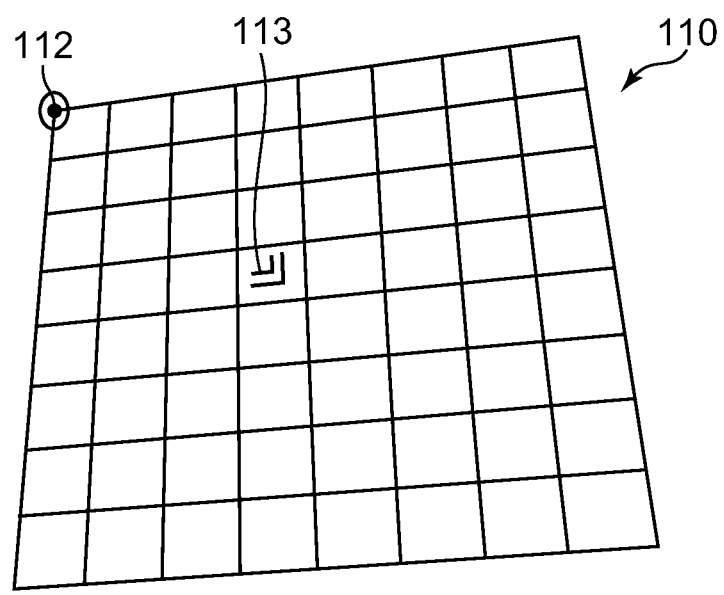
FIG. 25 is a diagram illustrating an adjustment chart according to an embodiment.

For example, as depicted in FIG. 25, when the first corner marker 112 on the first adjustment chart 110 is being adjusted, the first adjustment chart 110 may include the position guide mark 113 near the center of the first adjustment chart 110.

Figure 26:
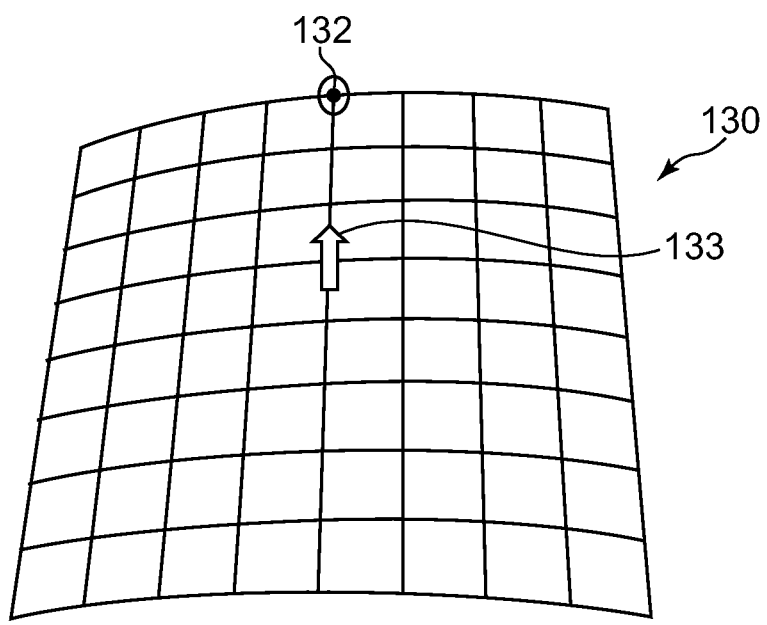
FIG. 26 is a diagram illustrating an adjustment chart according to an embodiment.

Similarly, for example, as depicted in FIG. 26, when the top side marker 132 on the third adjustment chart 130 is being adjusted, the third adjustment chart 130 may include a position guide mark 133 near the center of the third adjustment chart 130.

Moreover, intervals to update the values of the parameters by user manipulations may be linearly changed in response to the number of pressing the arrow key or the time to press the arrow key, for example, or may be changed in a different way.

For example, intervals can be changed for a shorter time or a longer time according to parameter values or user's instructions.

The present invention is not limited to the embodiments as they are, and can be embodied in the implementation stage by deforming the components within a range that does not depart from its spirit.

Moreover, various embodiments of the invention can be formed by an appropriate combination of a plurality of the components disclosed in the embodiments.

For example, even if some components are deleted from all the components illustrated in the embodiments, if the problem stated in the related art, the problem being attempted to be solved by the embodiments of the invention, can be solved and, if the effects of the embodiments of the invention can be obtained, the configuration where the components have been deleted can be extracted as an embodiment of the invention.

Furthermore, the components over the different embodiments may be combined as appropriate.

What is claimed is:

1. A projection apparatus comprising:
   a projection unit configured to project an image onto a target area on a curved surface formed of generatrices of a circular cylinder;
   an image conversion unit configured to apply geometric transformation to a projected image projected by the projection unit;
   a parameter acquiring unit configured to acquire a parameter expressing a positional relationship between the projection unit and the curved surface; and
   a transform function determination unit configured to determine a transform function for use in the geometric transformation based on the parameter,
   wherein the target area is an area surrounded by:
      a first line and a second line which are parallel to an axis of the circular cylinder;
      a third line that is an intersection line of a first plane perpendicular to the axis with the curved surface; and
      a fourth line that is an intersection line of a second plane parallel to the first plane with the curved surface, and
   when an image area is such an area that the image applied the geometric transformation is projected onto the curved surface, the parameter includes:
      a four-corner parameter to match four corners of the image area and four corners of the target area;
      a first middle point parameter to match a first middle point that is a middle point of a top side of the image area and a middle point of the third line of the target area;

a second middle point parameter to match a second middle point that is a middle point of a bottom side of the image area and a middle point of the fourth line of the target area; and a second reference line parameter to, when a line connecting the first middle point to the second middle point of the image area is a first reference line, adjust a position of a second reference line provided between a left side of the image area and the first reference line, or between a right side of the image area and the first reference line.

2. The projection apparatus according to claim 1, wherein the four-corner parameter includes:

a first parameter and a second parameter to match an upper left corner of the image area and an upper left corner of the target area that is an intersection point of the first line with the third line of the target area;

a third parameter and a fourth parameter to match a lower left corner of the image area and a lower left corner of the target area that is an intersection point of the first line with the fourth line of the target area;

a fifth parameter and a sixth parameter to match a lower right corner of the image area and a lower right corner of the target area that is an intersection point of the second line with the fourth line of the target area; and a seventh parameter and an eighth parameter to match an upper right corner of the image area and an upper right corner of the target area that is an intersection point of the second line with the third line of the target area, the first middle point parameter and the second middle point parameter include:

a ninth parameter to, when a position in an axial direction provided perpendicularly to the first line is referred to as a horizontal position, match horizontal positions of the first and second middle points and horizontal positions of the middle point of the third line and fourth line by changing the horizontal positions of the first middle point and the second middle point;

a tenth parameter to, when a position in an axial direction provided parallel to the first line is referred to as height, match a height of the first middle point and a height of the middle point of the third line by changing the height of the first middle point; and an eleventh parameter to match a height of the second middle point and a height of the middle point of the fourth line by changing the height of the second middle point, the second reference line is a one-fourth line connecting a middle point between the upper left corner and the first middle point to a middle point between the lower left corner and the second middle point and a three-fourths line connecting a middle point between the upper right corner and the first middle point to a middle point between the lower right corner and the second middle point, and the second reference line parameter is a twelfth parameter to move the one-fourth line and the three-fourths line in a direction perpendicular to the first line.

3. The projection apparatus according to claim 1, wherein the geometric transformation includes:

rotation projection transformation between a plane and a plane; and circular cylinder geometric transformation between the target area and a plane parallel to a third plane passing between the first line and the second line.

4. The projection apparatus according to claim 3, wherein the transform function determination unit determines the transform function for use in the rotation projection transformation based on the first parameter, the second parameter, the third parameter, the fourth parameter, the fifth parameter, the sixth parameter, the seventh parameter, and the eighth parameter, and the transform function determination unit determines the transform function for use in the circular cylinder geometric transformation based on the ninth parameter, the tenth parameter, the eleventh parameter, and the twelfth parameter.

5. The projection apparatus according to claim 2, further comprising:

a chart generation unit configured to generate an adjustment chart expressing the upper left corner, the lower left corner, the lower right corner, the upper right corner, the first middle point, the second middle point, the first reference line, and the second reference line, the adjustment chart being projected onto the curved surface by the projection unit; and an input unit configured to acquire moving directions of the upper left corner, the lower left corner, the lower right corner, the upper right corner, the first middle point, the second middle point, the first reference line, and the second reference line input by a user, wherein the parameter acquiring unit acquires the parameter for each input by the user to the input unit based on the moving direction input to the input unit, the transform function determination unit determines the transform function for each input by the user to the input unit based on the parameter, and the image conversion unit applies the geometric transformation to the adjustment chart for each input by the user to the input unit.

6. The projection apparatus according to claim 1, further comprising a condition acquiring unit configured to acquire a positional relationship between the projection unit and the target area, wherein the parameter acquiring unit acquires at least one of the parameters based on the positional relationship.

7. The projection apparatus according to claim 1, wherein the projection unit is configured to project an image onto a rotation target area obtained by rotating the target area about a barycenter of the target area, the parameter acquiring unit acquires a thirteenth parameter expressing the rotation and further included in the parameter, and the transform function determination unit determines the transform function for use in the geometric transformation to project an image onto the rotation target area based on the thirteenth parameter.

8. The projection apparatus according to claim 1, further comprising:

a transform function storage unit configured to store the transform function determined by the transform function determination unit; and a transform function reading unit configured to read the transform function stored in the transform function storage unit.

9. A projection apparatus comprising:

a projection unit configured to project an image onto a target area on a curved surface formed of generatrices of a circular cylinder;

an image conversion unit configured to apply geometric transformation to a projected image projected by the projection unit;

a parameter acquiring unit configured to acquire a parameter expressing a positional relationship between the projection unit and the curved surface; and a transform function determination unit configured to determine a transform function for use in the geometric transformation based on the parameter, wherein the target area is an area surrounded by:
- a first line and a second line which are parallel to an axis of the circular cylinder;
- a third line that is an intersection line of a first plane perpendicular to the axis with the curved surface; and
- a fourth line that is an intersection line of a second plane parallel to the first plane with the curved surface, and the geometric transformation includes:
- rotation projection transformation between a plane and a plane; and
- circular cylinder geometric transformation between the target area and a plane parallel to a third plane passing between the first line and the second line.

10. A projection state adjustment method comprising the steps of:

projecting an image onto a target area on a curved surface formed of generatrices of a circular cylinder from a projection unit;

applying geometric transformation to a projected image projected from the projection unit;

acquiring a parameter expressing a positional relationship between the projection unit and the curved surface; and determining a transform function for use in the geometric transformation based on the parameter, wherein the target area is an area surrounded by:
- a first line and a second line which are parallel to an axis of the circular cylinder;
- a third line that is an intersection line of a first plane perpendicular to the axis with the curved surface; and
- a fourth line that is an intersection line of a second plane parallel to the first plane with the curved surface, and when an image area is such an area that the image applied the geometric transformation is projected onto the curved surface, the parameter includes:
- a four-corner parameter to match four corners of the image area and four corners of the target area;
- a first middle point parameter to match a first middle point that is a middle point of a top side of the image area and a middle point of the third line of the target area;
- a second middle point parameter to match a second middle point that is a middle point of a bottom side of the image area and a middle point of the fourth line of the target area; and
- a second reference line parameter to, when a line connecting the first middle point to the second middle point of the image area is a first reference line, adjust a position of a second reference line provided between a left side of the image area and the first reference line, or between a right side of the image area and the first reference line.

11. A projection state adjustment method comprising the steps of:

projecting an image onto a target area on a curved surface formed of generatrices of a circular cylinder from a projection unit;

applying geometric transformation to a projected image projected from the projection unit;

acquiring a parameter expressing a positional relationship between the projection unit and the curved surface; and determining a transform function for use in the geometric transformation based on the parameter, wherein the target area is an area surrounded by:
- a first line and a second line which are parallel to an axis of the circular cylinder;
- a third line that is an intersection line of a first plane perpendicular to the axis with the curved surface; and
- a fourth line that is an intersection line of a second plane parallel to the first plane with the curved surface, and the geometric transformation includes:
- rotation projection transformation between a plane and a plane; and
- circular cylinder geometric transformation between the target area and a plane parallel to a third plane passing between the first line and the second line.

12. A non-transitory computer-readable storage medium storing a projection state adjustment program that causes a computer to:

project an image onto a target area on a curved surface formed of generatrices of a circular cylinder from a projection unit;

apply geometric transformation to a projected image projected from the projection unit;

acquire a parameter expressing a positional relationship between the projection unit and the curved surface; and determine a transform function for use in the geometric transformation based on the parameter, wherein the target area is an area surrounded by:
- a first line and a second line which are parallel to an axis of the circular cylinder;
- a third line that is an intersection line of a first plane perpendicular to the axis with the curved surface; and
- a fourth line that is an intersection line of a second plane parallel to the first plane with the curved surface, and when an image area such an area that the image applied the geometric transformation is projected onto the curved surface, the parameter includes:
- a four-corner parameter to match four corners of the image area and four corners of the target area;
- a first middle point parameter to match a first middle point that is a middle point of a top side of the image area and a middle point of the third line of the target area;
- a second middle point parameter to match a second middle point that is a middle point of a bottom side of the image area and a middle point of the fourth line of the target area; and
- a second reference line parameter to, when a line connecting the first middle point to the second middle point of the image area is a first reference line, adjust a position of a second reference line provided between a left side of the image area and the first reference line, or between a right side of the image area and the first reference line.

13. A non-transitory computer-readable storage medium storing a projection state adjustment program that causes a computer to:

project an image onto a target area on a curved surface formed of generatrices of a circular cylinder from a projection unit;

apply geometric transformation to a projected image projected from the projection unit;

acquire a parameter expressing a positional relationship between the projection unit and the curved surface; and determine a transform function for use in the geometric transformation based on the parameter, wherein the target area is an area surrounded by:
   a first line and a second line which are parallel to an axis of the circular cylinder;
   a third line that is an intersection line of a first plane perpendicular to the axis with the curved surface; and
   a fourth line that is an intersection line of a second plane parallel to the first plane with the curved surface, and
the geometric transformation includes:
   rotation projection transformation between a plane and a plane; and
   circular cylinder geometric transformation between the target area and a plane parallel to a third plane passing between the first line and the second line.

* * * * *